US011868599B2

(12) United States Patent
Conlon et al.

(10) Patent No.: US 11,868,599 B2
(45) Date of Patent: Jan. 9, 2024

(54) CARGO VESSEL OPERATOR EMERGENCY RESPONSE SYSTEM, WITH OPERATOR DIRECTIVES, INCIDENT DATA RECORDING AND REPORTING, AND AUTOMATED RELEVANT PARTY NOTIFICATION

(71) Applicant: OVERHAUL GROUP, INC., West Lake Hills, TX (US)

(72) Inventors: Barry Conlon, Leander, TX (US); Ronald J. Greene, Austin, TX (US); David Broe, Blackrock (IE)

(73) Assignee: Overhaul Group, Inc., Austin, TX (US)

( * ) Notice: Subject to any disclaimer, the term of this patent is extended or adjusted under 35 U.S.C. 154(b) by 245 days.

(21) Appl. No.: 17/087,545

(22) Filed: Nov. 2, 2020

(65) Prior Publication Data

US 2021/0132784 A1 May 6, 2021

Related U.S. Application Data

(60) Provisional application No. 62/929,823, filed on Nov. 2, 2019.

(51) Int. Cl.
| | |
|---|---|
| *G06F 3/04847* | (2022.01) |
| *G10L 15/22* | (2006.01) |
| *G07C 5/00* | (2006.01) |

(52) U.S. Cl.
CPC ......... *G06F 3/04847* (2013.01); *G07C 5/006* (2013.01); *G10L 15/22* (2013.01); *G10L 2015/223* (2013.01)

(58) Field of Classification Search
CPC ..... G06F 3/04847; G07C 5/006; G10L 15/22; G10L 2015/223
See application file for complete search history.

(56) References Cited

U.S. PATENT DOCUMENTS

| | | | |
|---|---|---|---|
| 9,697,352 B1 | 7/2017 | Armstrong | |
| 10,796,578 B1 * | 10/2020 | Jackson | ................. G08G 1/205 |

(Continued)

OTHER PUBLICATIONS

Patent Cooperation Treaty (PCT) International Application No. PCT/US20/58607, International Search Report and Written Opinion, dated Jul. 21, 2021.

*Primary Examiner* — Beau D Spratt
*Assistant Examiner* — Reji Kartholy
(74) *Attorney, Agent, or Firm* — Isidore PLLC

(57) ABSTRACT

A method, computer program product, mobile communication device, and a shipment tracking system provide automated incident recording, reporting, and response protocols, including operator directives. The method includes receiving an input identifying an occurrence of an incident associated with a shipment entity, the shipment entity being one or more of a vessel, an operator, and a cargo being transported via the vessel. The method includes, in response to the input, presenting on a user interface (UI) of an operator mobile communication device (MCD) one or more selectable incident reporting options to activate incident response, data recording, and reporting (IRDRR) protocols. The method further includes generating and presenting an incident response UI that instructs the operator of specific sequence of steps to take in response to the incident and to complete an incident information gathering process. The method further includes automatically transmitting/uploading a notification of the incident to an incident management server.

23 Claims, 10 Drawing Sheets

(56) References Cited

U.S. PATENT DOCUMENTS

| | | | |
|---|---|---|---|
| 10,854,055 B1* | 12/2020 | Cornell | G08B 3/1016 |
| 2012/0123806 A1* | 5/2012 | Schumann, Jr. | G06Q 40/08 |
| | | | 705/4 |
| 2014/0058730 A1 | 2/2014 | Costa et al. | |
| 2015/0039347 A1 | 2/2015 | Sharma | |
| 2015/0235164 A1 | 8/2015 | Key | |
| 2016/0182707 A1* | 6/2016 | Gabel | G06Q 10/10 |
| | | | 455/404.2 |
| 2016/0335596 A1* | 11/2016 | Richie | G06Q 10/10 |
| 2016/0353266 A1* | 12/2016 | Winkler | H04M 1/72424 |
| 2017/0161971 A1 | 8/2017 | Chambers | |
| 2019/0146815 A1 | 5/2019 | Smith, III et al. | |
| 2021/0004909 A1* | 1/2021 | Farmer | G06Q 40/08 |
| 2022/0001900 A1* | 1/2022 | Shimotani | B60W 50/14 |

* cited by examiner

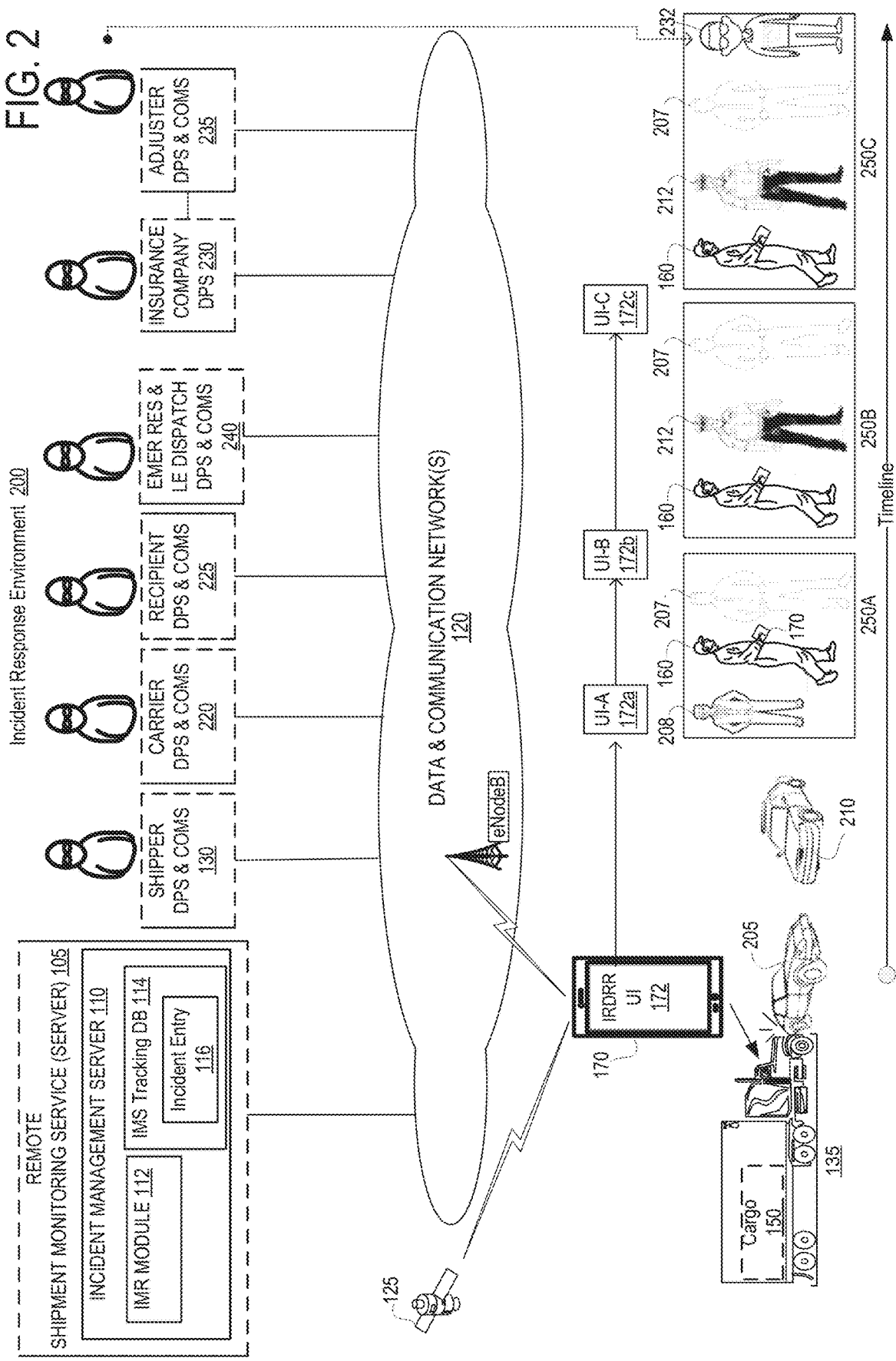

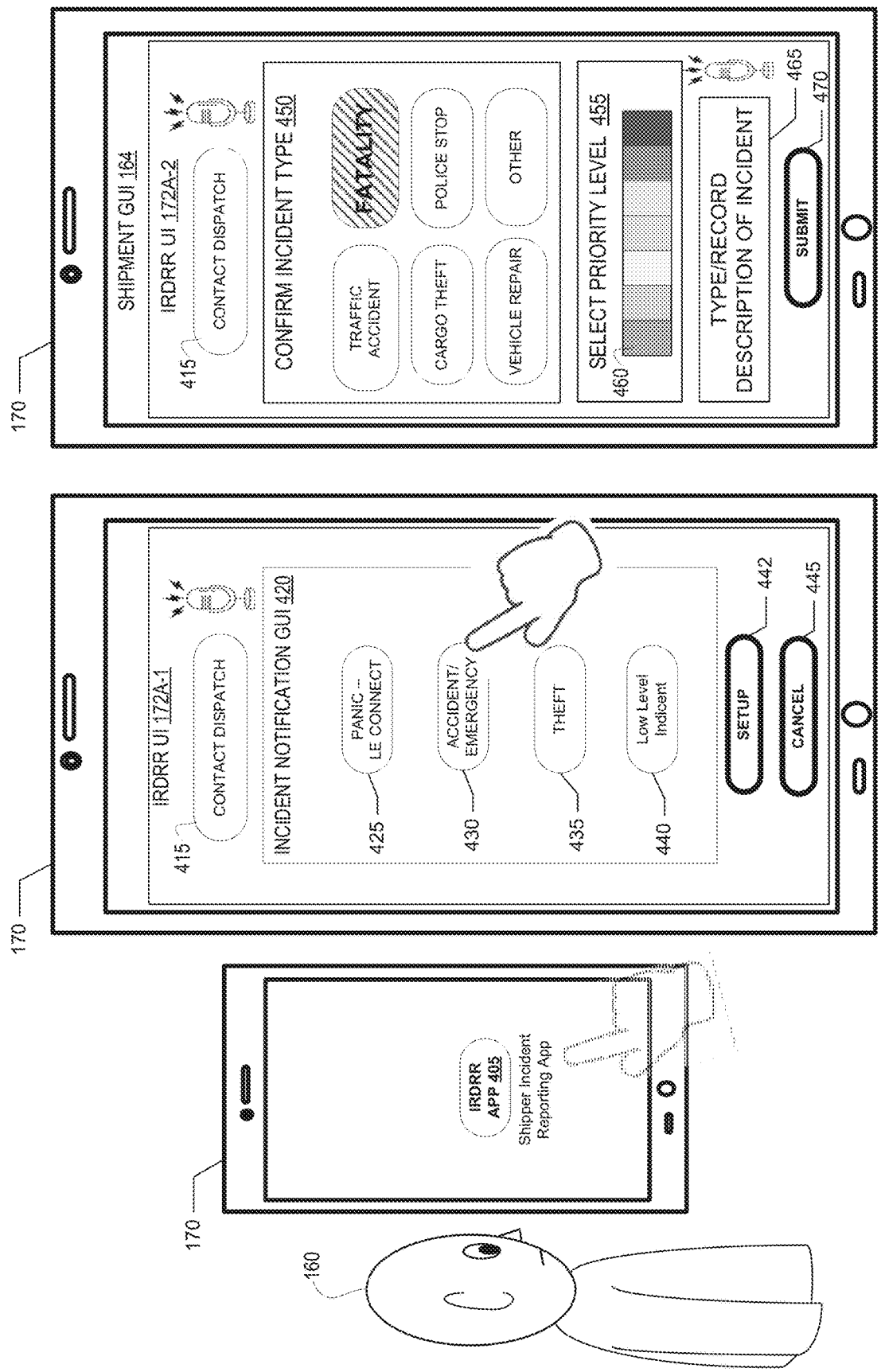

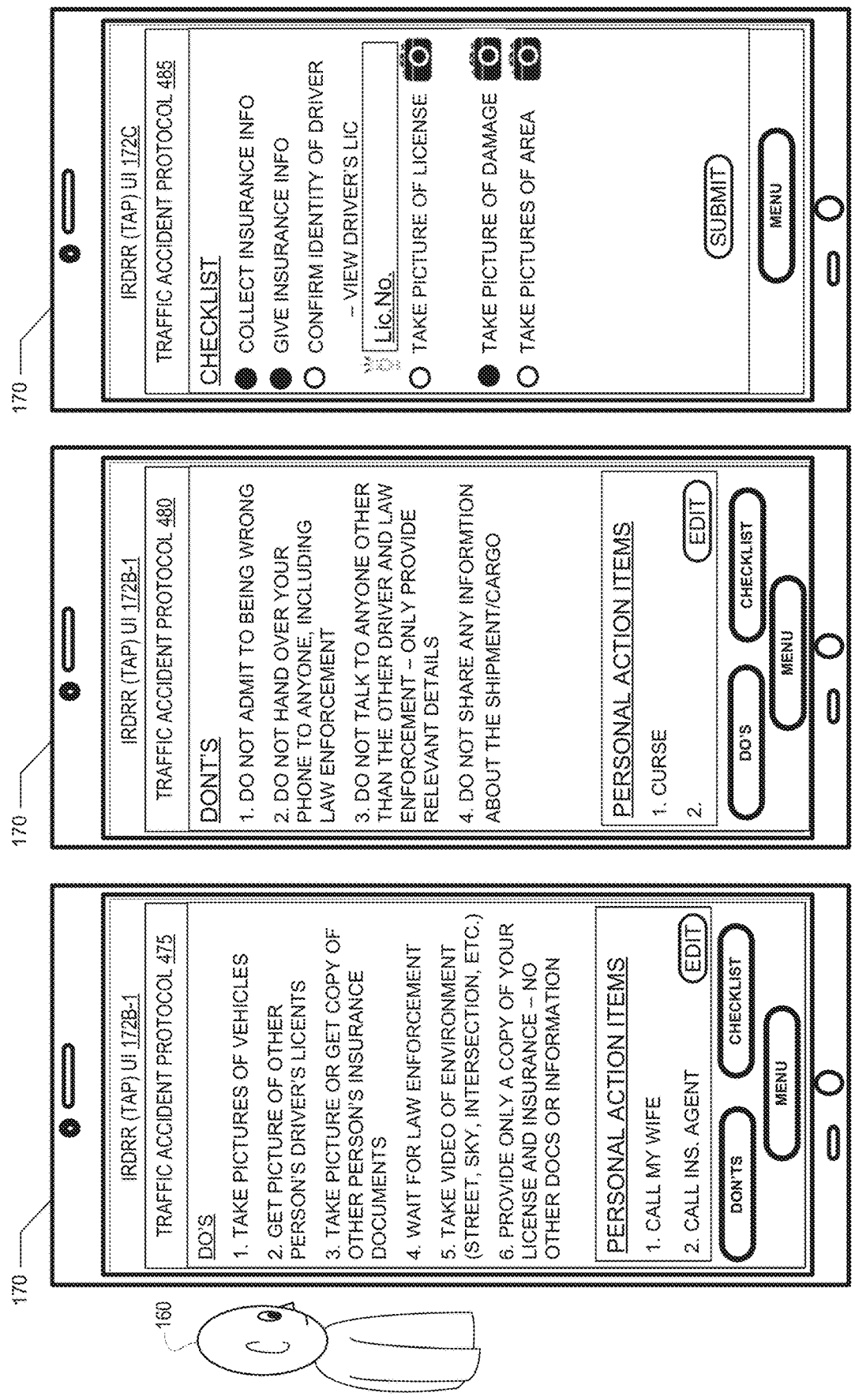

CARGO VESSEL OPERATOR EMERGENCY RESPONSE SYSTEM, WITH OPERATOR DIRECTIVES, INCIDENT DATA RECORDING AND REPORTING, AND AUTOMATED RELEVANT PARTY NOTIFICATION

PRIORITY & RELATED APPLICATIONS

The present application claims priority from U.S. Provisional Application No. 62/929,823, filed on Nov. 2, 2019, with the entire content of that provisional application being incorporated herein by reference.

BACKGROUND OF THE INVENTION

1. Field of the Invention

The present disclosure is generally related to cargo transportation via moving vessels, and in particular to a method, a system, and a mobile communication device providing operator directives and automated responses and notifications to shipment-related emergency and other incidents.

2. Description of the Related Art

Shipment of cargo via operator-controlled moving vessels (e.g., a tractor-trailer, boat, airplane, drone, or other moving vessel) has inherent risks of incidents occurring during the shipment life cycle. In the cargo shipment industry, an operator of a cargo transporting vessel may occasionally be involved in an incident that involves or can result in possible danger/damage/losses to the cargo, the vessel, or a third party property (e.g., a moving vehicle, a home/yard, or tangible property) and/or damages or injury or even death to the operator, a third party human or pet. When such incidents occur, the operator may initially panic or be otherwise consumed with dealing with the situation. If the incident occurs in remote or secluded location, it may be the case that only the operator and an involved third party are fact witnesses to the incident, until law enforcement or emergency personnel arrives on scene. All of the other relevant shipment-related parties (i.e., those having an interest in the cargo being transported or an interest in the shipping vessel or the operator) are often not made aware of the incident until sometime later, after the fact finding is completed by the parties present, which may include law enforcement. The relevant parties may be informed of portions of the details much later, when the operator contacts one more of the dispatcher, shipper, or other relevant party, such as the insurance agent/company.

Oftentimes, the operator is untrained and/or unaware of the potential risks involved with the incident that can adversely affect the operator and other relevant parties. With the initial shock or heightened emotions or momentary lapse in judgement that often follows immediately after the incident, the operator is vulnerable to not making correct decisions on the spur of the moment. This along with a combination of being naïve or unaware, often results in the operator making statements to an involved third party, a bystander, law enforcement or emergency personnel at the time and/or location of the incident that could be harmful to the operator, his employer (e.g., the carrier), or one of the other relevant parties associated with the shipment (e.g., the shipper or recipient), and by extension their insurers. The operator is on a proverbial "island" having to independently respond to the incident and interact and communicate with any involved third party and law enforcement.

The operator also typically does not know what information is required to be collected to best inform others about or to make a historical record concerning the incident. The failure to properly record and/or document information related to the incident and/or to timely inform others in the shipping chain about the incident can/could materially (e.g., financially) affect the owner of the cargo, the shipper, the operator, and/or others with a vested financial or other interest in the shipment (collectively "relevant parties"). Even if properly trained to manually record the relevant information, the operator may not know who to provide that information to, as information about the upper chains of communication is not normally communicated to or known by the operator of the vessel.

SUMMARY

The disclosed embodiments provide a method, computer program product, mobile communication device, and a shipment tracking system that provides automated incident recording, reporting, and response protocols, including operator directives. According to one aspect, the method includes receiving an input identifying an occurrence of an incident associated with a shipment entity, the shipment entity being one or more of a vessel, an operator, and a cargo being transported via the vessel. The method includes, in response to the input, presenting on a user interface (UI) of an operator mobile communication device (MCD) one or more selectable incident reporting options to activate incident response, data recording, and reporting (IRDRR) protocols. The method further includes generating and presenting an incident response UI that instructs the operator of a specific sequence of steps to take in response to the incident and to complete an incident information gathering process. The method further includes automatically transmitting/uploading a notification of the incident to an incident management server.

According to one embodiment, presenting of the selectable reporting options includes presenting, on a display of the MCD, a graphical user interface (GUI) object for activating an IRDRR application and, in response to user selection of the GUI object, presenting a first incident reporting UI with the one or more selectable incident reporting options. The presenting of the selectable reporting options further includes monitoring for receipt of a first trigger that identifies a type of incident and activates a corresponding incident response (IR) protocol of the IRDRR application, based on the selected incident reporting option. The method then includes performing functions of the corresponding incident response protocol in response to receipt of the first trigger.

According to one embodiment, presenting the incident response module includes presenting, on the UI, a series of directives to the operator, the series of directives comprising recommended actions, avoidances, and speech suggestions that limits an exposure of the operator and that directs approved operator behavior in response to the incident. According to one or more embodiments, presenting the incident response module includes one or more of (i) presenting a list of "Do's and Don'ts" for the operator to read and follow, the "Do's and Don'ts" corresponding to the identified type of incident and (ii) presenting specific prompts advising the operator what to say and what not to say and what information to share with a third party, including law enforcement personnel and emergency response personnel.

According to one or more embodiments, presenting the incident response module includes (i) presenting, on the UI, a checklist of directives to be completed by the operator, (ii) recording operator input indicating completion of items on the checklist, (iii) storing an operator submitted copy of the checklist with the operator input to local storage along with corresponding incident identifying data, (iv) attaching the operator submitted copy of the checklist with a generated notification, and (v) forwarding the notification including the copy of the checklist to an incident management service.

According to one embodiment, the method includes compiling incident data to include within/with the notification. The compiling of the incident data includes selecting, based on one of (a) a received trigger word or phrase within a first voice input that initiates an IRDRR application process and (b) a received selection of a specific incident reporting option within an incident reporting UI, a corresponding notification from among multiple different notifications, each different notification associated with a specific one of multiple different types of incidents identified by different pre-established trigger words or phrases or different selectable options. The compiling includes embedding within the notification relevant incident identifying and reporting information including (i) at least one of an MCD identifier and an operator identifier, (ii) a geographic location and time of the incident; and (iii) any additional information inputted by the operator for inclusion within the notification. The compiling further includes attaching to the notification any incident-related audio files or images captured contemporaneously with the incident.

In yet another embodiment, presenting the incident response module includes (i) outputting a request for the operator to capture incident-related images via at least one of photographs and video, the request including information identifying specific detail to be captured in the incident-related images, (ii) detecting capture of one or more images contemporaneously with the incident, and (iii) storing the one or more images along with an incident identifier as the incident-related images. According to one related aspect, the method includes, in response to detecting capture of the one or more images, tagging the one or more images with the incident identifier. The method further includes storing the one or more images along with the incident identifier as the incident-related images and forwarding the incident-related images along with a notification of the incident to an incident reporting service. The forwarding of the incident-related images includes automatically uploading any images captured contemporaneously with detection of the incident to the incident reporting service for storage within an incident tracking database.

According to one embodiment, the input is a first voice input that is audibly detected while the MCD is in an always-on listening mode. In this embodiment, the method includes receiving the first voice input and comparing content within the first voice input to a set of pre-established incident trigger words or phrases that identifies at least one specific type of incident. The method also includes, in response to detecting a match of the content of the first voice input with one or more of the pre-established incident trigger words or phrases, triggering activation of IRDRR application processing to record and report the specific type of incident identified within the content of the first voice input and activate the incident response protocols for the operator.

According to one embodiment, presenting the incident response module includes presenting a selectable audio recording button to activate audio recording of events occurring contemporaneously with the incident. In response to operator selection of the audio recording button, the method further includes activating a recording function of the MCD, the activating including presenting a visual indication of an active recording process. The method also includes setting a timer for the recording to terminate and monitoring the timer by comparing the elapsed timer with a pre-established maximum recording time threshold. The method then includes, in response to one of (a) the timer expiring or reaching the pre-established maximum recording time threshold or (b) receipt of a manual input to stop the recording, terminating the audio recording, tagging the audio recording with an incident identifier to generate an incident-related audio file, and storing the incident-related audio file to local storage. The method includes forwarding the incident-related audio file along with a notification of the incident to the incident reporting service for storage with an entry for the incident within a shipment tracking database. Accordingly, an audio recording of any verbal communication and interaction with law enforcement and other third parties connected to the incident is acquired in real time and made available for access by relevant personnel, such as an insurance adjuster or company, or a legal representative of the operator or insurance company.

According to one aspect, the method includes determining the type of incident from among a pre-established listing of incident types that can occur with the shipment. The method includes identifying when the incident is a liability-attaching incident that can result in liability of the operator or shipper, potential financial or other damages, or other losses that would be covered by an insurance carrier. And, in response to the incident being a liability-attaching incident, the method includes triggering an instantiation of the IRDRR application processing, identifying each relevant party that may be affected by the liability-attaching incident, retrieving contact information for the identified relevant party, and generating and transmitting the notification of the incident directly to the identified relevant party with an incident report compiled from data collected contemporaneously with occurrence of the incident.

According to another aspect of the disclosure, the mobile communication device (MCD) includes a wireless transceiver that enables connection of the MCD with a shipment tracking service via an external network. The MCD also includes a display device for presenting data and objects within a user interface. The MCD includes (i) a memory having stored thereon an incident response, data recording, and reporting (IRDRR) module and a communication module, and (ii) a communication interface enabling communication with external devices via a network, and (iii) a storage that stores data and other information. The MCD also includes a processor that is communicatively coupled to each of the wireless transceiver, the display device, the memory, the communication interface, and the storage. The processor executes the IRDRR module, which configures the MCD to receive an input identifying an occurrence of an incident associated with a shipment entity. Execution of the IRDRR module further configures the MCD to, in response to the input, present on the UI one or more selectable incident reporting options to activate IRDRR protocols, and generate and present an incident response UI that instructs the operator of a specific sequence of steps to take to respond to the incident and complete an incident information gathering process.

According to some additional aspects, the IRDRR module configures the MCD to perform several of the additional above-presented method functions and features. These features and functions include configuring the MCD to, present at least one of: (i) a list of "Do's and Don'ts" for the operator to read and follow, the "Do's and Don'ts" corresponding to the identified type of incident; and (ii) specific prompts advising the operator what to say and what not to say and what information to share with a third party, law enforcement personnel and emergency responders.

According to yet another aspect of the disclosure, a shipment tracking system is provided. The shipment tracking system includes a network interface enabling communication with a plurality of operator mobile communication devices (MCDs) via a network. The shipment tracking system further includes at least one incident management server (IMS) that is communicatively coupled to the network and is thus communicatively coupled to at least one operator MCD. The at least one IMS includes a memory having stored thereon an incident recording and notification (IRN) module and a processor that executes the IRN module. Processor execution of the IRN module configures the at least one IMS to receive, from an operator MCD, a notification of an incident involving at least one shipment entity. In one or more embodiments, the IMS parses the notification to identify whether the incident is a liability-attaching incident. Then, in response to the incident being a liability-attaching incident, the IMS retrieves a list of relevant parties that require information and/or notification about the liability-attaching incident. The relevant parties include an insurance adjuster and at least one company insuring one or more of the shipment, the carrier, and the operator. The IRN module further configures the IMS to identify, based on the type of incident that has occurred, any other parties relevant to the incident and to the shipment. The relevant parties can be different for each type of incident and the shipment entities associated with the shipment. The IRN module configures the IMS to forward to the relevant parties specific information about the incident that is required by the relevant party when the particular type of incident is recorded.

As one aspect, the shipment tracking system further includes an incident tracking database and the IRN module includes program code that configures the IMS to create an incident report including information about the incident that is received with the notification and any contemporaneously received or contemporaneously captured/recorded information received by the IMS about the incident. The IMS stores the incident report within an entry of the incident tracking database and updates the incident report in response to a subsequently received additional information related to the incident.

In one embodiment, the shipment tracking service responds to receipt of the contemporaneously-captured photographs by tagging the photographs with a location and a time of capture and associating the stored photograph with an entry created for the incident within the incident tracking database. The database entry also includes operator and carrier identifying information and additional details about the cargo being transported that is relevant to creating a substantially complete history of the incident.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 2 illustrates an example incident response and reporting environment that enables detecting, responding via operator directives, recording, reporting, and notification of an incident/accident involving an operator-controlled tractor-trailer, according to one or more embodiments;

FIGS. 4A-4C illustrate three user interfaces generated by activation of the IRDRR module on the MCD presenting operator-selectable options for identifying and reporting an incident, in accordance with one or more embodiments;

FIGS. 4D and 4E illustrate example content presented on an operator MCD executing the IRDRR module, with a series of instructions presented within the user interface to guide the operator's actions, speech, and behavior following the occurrence of an incident, according to one more embodiments;

FIG. 4F illustrates a UI presenting an example list of action items to be completed by the operator following the occurrence of an incident, according to one more embodiments;

DESCRIPTION OF THE ILLUSTRATIVE EMBODIMENTS

Figure 1:
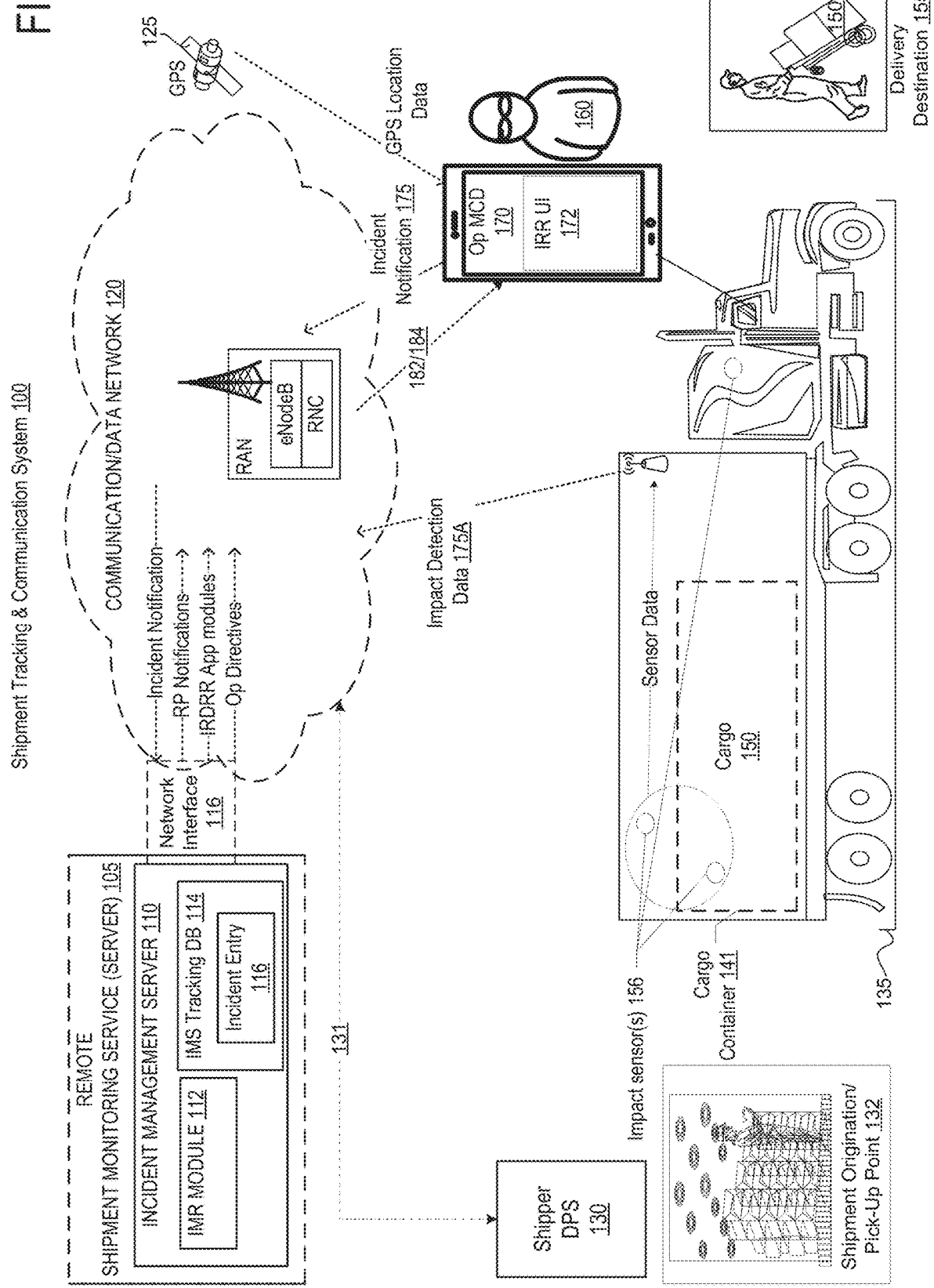
FIG. 1 illustrates an example shipment tracking and communication system for use in monitoring cargo being transported via operator-controlled transport vessels, such as tractor-trailers, according to one or more embodiments.

The illustrative embodiments of the present disclosure provide a method, a computer program product, a mobile communication device (MCD), and a shipment tracking system that provide automated incident recording, reporting, and response protocols, including operator directives. According to one aspect, the method includes the MCD receiving an input identifying an occurrence of an incident associated with a shipment entity, the shipment entity being one or more of a vessel, an operator, and a cargo being transported via the vessel. The method includes, in response to the input, presenting on a user interface (UI) of an operator mobile communication device (MCD) one or more selectable incident reporting options to activate incident response, data recording, and reporting (IRDRR) protocols. The method further includes generating and presenting an incident response module UI that instructs the operator of a specific sequence of steps to take in response to the incident and to complete an incident information gathering process. The method further includes automatically transmitting/uploading a notification of the incident to an incident management server.

According to one aspect, several of the processes are automated to protect the shipment related entities, including the operator, vessel owner, if different from the operator, cargo owner, shipper, or other invested party from potential liability or increased losses (financial and/or otherwise) by (i) providing the operator with situation-appropriate directives/guidance when involved in an incident in order to avert or prevent improper response handling by the operator and (ii) providing timely notification of the incident to relevant parties. According to one embodiment, presenting the incident response module includes presenting, on the UI, a series of directives to the operator, the series of directives comprising recommended actions, avoidances, and speech suggestions that limits an exposure of the operator and that directs approved operator behavior in response to the incident.

In one or more of the described embodiments, the incidents are emergency situations involving one or more of the operator, the vessel, and the cargo. As one example, the incident can be an accident involving a tractor-trailer (vessel) driven by the operator and another vehicle, driven by an involved third party. In this scenario, the operator may be unaware of what information is required to be collected from the driver of the other vehicle and/or what information the operator should share with either the other driver or on-the-scene emergency personal, such as law enforcement. The present disclosure closes that gap in operator knowledge about how to respond or act when involved in an incident by providing the operator with specific instructions on appropriate actions and statements or communication exchange in the specific situation identified, both during and after the incident occurs. In a related embodiment, the specific details of the accident, such as the damages to the shipping vessel, the third party vehicle, or other physical property or any injuries to the operator, other driver, occupants in either vehicle, or others in vicinity of the incident may not be readily available to anyone except those directly involved and on the scene. Some of those details are lost once the people and the vehicles are moved from the location of the accident. At least one embodiment of the present disclosure also accounts for this potential gap in evidence collection and accident recreation by provided specific instructions to the operator to collect photograph and/or video images of the vehicles and the roadway and surrounding environment that may prove helpful at a later date for review by an insurance adjuster or an attorney of the operator, carrier, shipper, or insurance company, for example. Additional embodiments of the disclosure provide for audio recordings and/or manual entry by the user to allow the information about the incident to be preserved contemporaneously with the occurrence of the incident.

As provided within the disclosure, it is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Throughout the description, the term shipment refers primarily to the transportation of cargo via a transport vessel from an origination point (shipper) to a delivery point. Several other terms utilized throughout the disclosure are provided with functional descriptive names that represent the meanings and/or the context in which the terms are presented and/or utilized. Within the description of the features of the disclosure and the accompanying drawings, the embodiments are presented from the perspective of a tractor-trailer based shipment environment, where a "shipment" includes a cargo being transported by a transport vessel, such as a tractor trailer. It is appreciated that while presented as a tractor-trailer vehicle, the disclosure extends to different types of on-terrain transport equipment available, including, but not limited to, flatbeds, dry vans, refrigerated trucks, trains, etc. It is understood that the features and functionality described herein can also be applicable to different types of on-land motorized equipment, such as cars, RVs, busses, motorcycles, and the like, without limitation. Further, the vessel can, in some instances, be non-motorized vehicles, such as bicycles and other non-motorized form of transportation.

Additionally, the disclosure utilizes the term "vessel" in order to also account for non-terrain cargo transportation, such as via airplanes and watercrafts and drones. These "vessels" can also be controlled by an operator and be involved in one or more incidents. The underlying features of the disclosure are thus fully applicable to other transportation and/or shipping spaces, such as water-based shipping (e.g., ocean cargo or river cargo), where the operators are ship captains, the vessel is either a floating vessel or an amphibious vessel. Air based transportation is also a supported space that can include a framework designed for interfacing by air-based cargo shippers, with the operators being the pilots of the planes, etc. It is further foreseeable that the functionality of the presented framework/environment can be extended to a transportation space involving drone shipments, for example, where the drone operators (pilots) are not co-located with the drone equipment.

For simplicity and completeness, the disclosure is described from the perspective of a shipment that includes a cargo being transported over ground by a transport vessel that is a tractor-trailer, where the operator is the driver. Notably, certain aspects of the disclosure have general applicability to situations that are not shipment related. A driver of any vehicle can benefit from having the local incident response application on his personal device, even without the need to have real-time upload of incident data to a remote server.

The majority of the terms utilized herein are generally known to those in the shipping industry. The majority of the terms utilized herein are generally known to those in the shipping industry. Certain coined terms are utilized herein in describing the features and functionality of the disclosure. For example, the term "shipment-related entity" is utilized to reference each of the following, without limitation: a cargo, a cargo container, a tractor (e.g., a motorized vehicle/vessel), a trailer (e.g., a wheeled container), a tractor-trailer combination, a transport vessel, a driver/operator, and an operator mobile communication device (MCD). One or more of the shipment-related entities is provided with a location tracking mechanism, such as a GPS transponder, which enables the geographic location of the collective shipment (i.e., all entities for a single shipment) to be determined.

Within the disclosure, the term relevant party refers to and/or can include one or more, or all of, the owner of the cargo, the shipper, the owner of the transport vessel, if different from the operator, the intended recipient of the cargo, an insurance company that insures one or more of the shipment-related entities, an attorney representing one or more of these other parties, and others with a vested interest in the cargo and/or the transport vessel, and/or the operator. Also, as presented within the description of the disclosure, the term incident is broadly utilized to represent events that can be emergencies and other events that are not considered emergencies. Thus, the use of emergency is understood to be encompassing incidents that are considered emergency events. In contrast, however, not every use of the term incident refers to an emergency. According to one aspect, each incident type can have a different list of relevant parties. For example, the insurance agent may only be relevant for incidents (e.g., cargo or vehicle theft and collisions) where there is financial liability that has to be covered by the insurance company.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

The attached figures present various aspects and/or features of the described embodiments; however, certain features may not be expressly presented within the figures and/or the description thereof. Within the descriptions of the different views of the figures, similar elements are provided similar names and reference numerals as those of the previous figure(s). The descriptions of the illustrative embodiments are therefore be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein.

Those of ordinary skill in the art will appreciate that the hardware, firmware/software utility, and software components and basic configuration thereof depicted in the following figures may vary. For example, the illustrative components of operator mobile communication device (MCD) 170 (FIG. 3A) and incident management server (IMS) 110 (FIG. 7) are not intended to be exhaustive, but rather are representative to highlight some of the components that are utilized to implement certain of the described embodiments. For example, different configurations of either IMS 110 or operator MCD 170 may be provided, containing other devices/mechanism/components/features, which may be used in addition to or in place of the hardware depicted and/or described, and the devices may be differently configured. The depicted examples are therefore not meant to imply architectural, usage, or other limitations with respect to the presently described embodiments and/or the concepts of the general disclosure.

Turning now to the figures, FIG. 1 illustrates an example communication infrastructure (or shipment communication network environment) 100 within which an operator MCD 170 communicates with a background incident management system (IMS) 110 within a remote shipment monitoring system/service (105) to support the local operator-level and remote server-level incident response and reporting features of the disclosure. Communication infrastructure 100 generally includes distributed server data processing system (DPS) within which is provided incident management server (IMS) 110. The server DPS generally operates as a remote shipment tracking server. IMS 110 includes IMS response (IMIR) module 112 and an associated incident tracking database (DB) 114, also referred to herein as IMS DB 114. An example incident entry 116 is shown within IMS DB 114. IMR module 112 executes to configure IMS 110 to perform the sever-level incident response features described herein.

Communication infrastructure 100 also includes communication/data network 120. Communication/data network 120 includes a plurality of communication devices and subnetworks that enable voice, data, and other forms of communication between two or more entities that connect to communication/data network 120. Communication/data network 120 supports transmission of wirelessly communicated signals via intermediary receiving devices, such as antennas, network nodes, such as evolution Node B (eNodeB), and access points. Communication/data network 120 can include cloud storage for storing relevant carrier and shipping data and other historical data, including incident reporting data, as one example. Shipment tracking server, server DPS 105, and/or IMS 110 communicatively connects with other devices over communication/data network 120 via network interface 116. Network interface 116 enables communication of incident reports and notifications, location signals and other data and/or information between server DPS 105 and other devices. In one embodiment, server DPS 105 facilitates or supports download of a shipment tracking application onto operator MCDs to enable local operator MCDs to interface with certain of the features and functionality supported/provided by the shipment tracking system. Communication infrastructure 100 further includes global positioning system (GPS) satellite 125 as one methodology utilized to identify/determine a current geographical location of a shipment-related entity, as described herein. Communication infrastructure 100 includes a communication link 131 to shipper DPS 130, which also monitors shipment of cargo 150 from shipment origination point 132. The cargo (or shipment) 150 is transported to a delivery destination 155 via one or more shipping routes. Communication infrastructure 100 enables efficient communication with operators and supports the monitoring and tracking of the various shipment-related entities within a shipment group.

According to one embodiment, each shipment-related entity can be tracked via a localized location tracker/sensor. In one or more embodiments, operator MCD 170 can rely on cell tower triangulation for location detection, in addition to or in place of GPS-based location detection. As presented, the shipment-related entities include cargo 150, being transported in/via tractor-trailer 135, driven by operator 160, who has operator mobile communication device (MCD) 170. In the illustrated embodiment, each shipment-related entity is equipped with impact sensors 156, which detect sudden, negative changes in velocity that correlates to the vessel being in a collision with another object (i.e., an impact). In one embodiment, impact sensors 156 transmits the detected impact data to a wireless transmitter, which communicates the impact data to IMS 110 via communication network 120 (potentially using operator MCD as an intermediary communication device). IMS 110 can respond to this automated notification of a potential incident by instantiating a communication with the operator MCD to obtain additional details about what is occurring or has occurred to trigger the impact sensors. Additional features of this automated response process are provided in the below description of the disclosure.

As illustrated, the operator's MCD 170 is configured with one or more applications, which enables the presentation of a plurality of incident response data retrieval and reporting (IRDRR) user interfaces (UIs) to operator, as described in greater detail within the description of FIGS. 2-6.

FIG. 2 provides an incident response environment 200, which includes an incident that triggers both local operator MCD features and server-level features involving communication with one or more relevant parties, in accordance with multiple embodiments. Beginning at the bottom left of the figure, incident response environment 200 presents a collision between operator-controlled vessel (tractor-trailer) 135, driven by operator 160, and a third party vehicle 205 driven by affected third party 207. An on-the-scene bystander 208 and law enforcement personnel 212 are also presented within the presented embodiment, but are not necessarily present in other incident scenarios. The collision and subsequent, contemporaneous activity, interactivity, and communication exchanged between the different people is hereinafter collectively referred to as an incident. It is appreciated that, while only a single affected third party 207 is presented, additional occupants can be inside vehicle 205 and the collision could have caused damage to another vehicle or property or injury to a pedestrian. These other individuals could then also be considered affected third parties. For simplicity, these third-party individuals are collectively represented as third party 207. It is appreciated that other emergency response personnel may also arrive on the scene, and the presentation herein of LE personnel 212 is not meant to be limiting, but to instead cover those individuals as well.

The bottom right of the figure presents a timeline with three inset images 250A, 250B, 250C of the operator 160 at different stages of engagement following the incident. In first inset image 250A, operator 160 is first engaged in communication and/or information exchange with affected third party 207 (e.g., the driver of the vehicle involved in the collision)), then in second inset image 250B, operator 160 is engaged in communication and/or information exchange with law enforcement (LE) personnel 212, (which can be with or without the presence of involved third party 207). Within the sequencing of the figures, LE personnel 212, is assumed to arrive on scene via LE vehicle 210 at some later period of time (e.g., 15 minutes) following the initial collision. At some point, the conversation or information exchange may include bystander 208, who may be a witness to the incident. At a later time, shown by third inset image 250C, an insurance adjuster or representative may also be present to assist the operator capture information about the incident.

At each of the different points of time from the collision to the final communication among the parties, operator 160 keeps operator MCD 170 in his possession and is able to reference specific UIs on operator MCD 165 to receive guidance and directives on what to do and/or say. These UIs are generally represented as UI 172a, 172b, and 172c. Notably, as will become clearer in the later description of FIGS. 4A-4E, during each period and/or for each of the three identified scenarios (250A, 250B, 250C), operator MCD 170 presents a different UI 172A-172C with important instructions for operator to follow. In one embodiment, operator 160 selects which UI to view based on which stage of the incident response the operator is in or about to enter. Thus, operator can select a different/appropriate UI (172B) to view prior to speaking with the LE personnel 212. A checklist UI (172A) can be utilized to collect and share information from/with the involved third party. More details about possible information provided via these UIs 172A-172C are presented in FIGS. 4A-4F, described below.

The top right section of the figure presents a series of computer and communication devices for personnel of the relevant parties who would have an interest in receiving the incident reports and/or notification about the incident. It is appreciated that the communication of the incident data occurs via these network-connected devices. For clarity, the devices are described based on the specific relevant party with whom the device is associated. According to the illustrative embodiment, the incident reports and/or notifications can be communicated via communication network 120 to select data processing and communication devices of shipper 130, operator home base (carrier) 220, cargo recipient 225, insurance company 230 and insurance adjuster 235. Incident data and notification is also communicated to emergency response and/or law enforcement dispatcher 240. Computer device and/or MCD (130, 220, 225, 230, 235, 240) of each relevant party is communicatively connected, via communication network 120, to IMS 110 associated with shipment monitoring service 105. Notably, in one embodiment presented in inset 250C, because of an early notification of the incident, a local insurance adjuster is able to arrive on the scene of the incident contemporaneously with the occurrence of the incident. The early notification is received at one of adjuster DPS 235 or insurance company DPS 230 from IMS 110. Instructions and directives can also be provided from IMS 110 to operator MCD 170 in one or more embodiments.

Figures 3A, 3B:
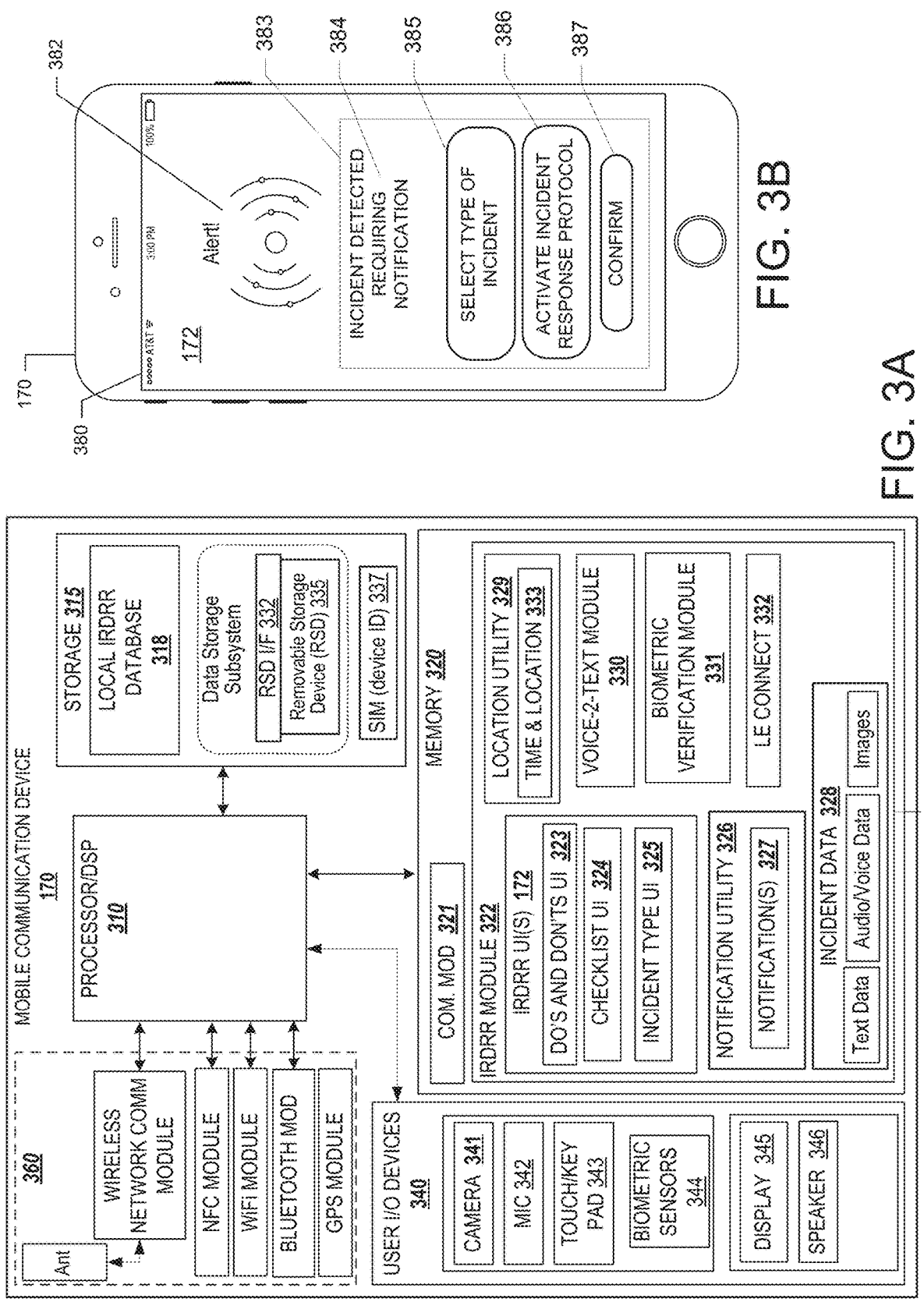
FIG. 3 illustrates an example mobile communication device (MCD) utilized by an operator and which is configured with an IRDRR application that provides incident detecting, responding via operator directives, recording, reporting, and notification, in accordance with a plurality of embodiments.

Turning now to FIG. 3A, there is illustrated a block diagram representation of component makeup of an example operator MCD 170. Operator MCD 170 can be any mobile communication device that can provide the features described herein. Operator MCD 170 operates within a wireless communication network and serves as both the data processing and communication device within which several of the operator-associated features of the disclosure can be implemented. According to one aspect, operator MCD 170 is designed to communicate with other devices via a wireless communication network, which is generally presented as being included within communication/data network 120 (FIGS. 1 and 2). MCD 170 can be one of a plurality of different types of devices, including but not limited to, a mobile cellular phone or smart-phone, a laptop, a net-book, an ultra-book, and/or a tablet (e.g., an iPAD®), or other computing device configured to enable wireless connectivity. MCD 170 includes the necessary hardware and software to enable wireless-enabled communication between MCD 170 and a wireless infrastructure network that enables exchange or transmission of information and/or data and voice communication that are required to implement the various features described herein to facilitate incident detection, response, and reporting features, as described herein.

Referring now to the specific component makeup and the associated functionality of the presented components, MCD 170 comprises processor 310, which connects via a plurality of interconnects (illustrated by the bi-directional arrows) to a plurality of other functional components of MCD 170. Processor 310 can be an integrated circuit that includes one or more programmable microprocessors and a digital signal processor (DSP). Processor 310 controls the communication, program code execution, power mode control, time synchronization, and other functions and/or operations of MCD 170. These functions and/or operations thus include, but are not limited to, application data processing and signal processing.

Connected to processor 310 is storage 315, memory 320, input/output (I/O) devices and communication interfaces 360. As provided, storage 315 contains local IRDRR DB 318 that can include an entry of data associated with an incident, in one or more embodiments. In one embodiment, storage 315 includes a subsystem that provides removable storage device interface (RSD I/F) 332, which supports removable insertion of an RSD 335 on which computer instructions can be programmed to support the features described herein. Storage 315 also includes a subscriber identification module (SIM) 337 or similar component that provides a unique device ID and contact information for operator MCD 170.

Memory 320 can include volatile memory and/or non-volatile memory. During device operation, one or more executable applications can be stored within memory 320 for execution by processor 310. For example, memory 320 is illustrated containing communication module 321, supporting the communication aspects of MCD 170, and incident response, data recording, and reporting (IRDRR) module 322. In one embodiment, IRDRR module 322 is a downloadable app or utility that executes on MCD 170. IRDRR Mod 322 includes IRDRR user interfaces (UIs) 172, of which Dos and Don'ts UI 323, checklist UI 324, and incident type UI 325 are presented, as examples. IRDRR Mod 322 includes notification utility 326, which executes to generate and transmit one or more notifications 327 to IMS 110 via communication module 321 based on incident data 328 received and/or detected. Incident data 328 is maintained in IRDRR database 318. IRDRR Mod 322 also includes location and time utility 329, which provides time and location data 333 of the incident. In one embodiment, a GPS sensor or other location detection sensor or function of MCD is utilized to report an exact location of MCD 170 to the IRDRR Mod 322. An internal clock/timer of MCD 170 or downloaded time data from a nearby communication tower can be used to provide the local time. IRDRR Mod 322 can then utilize this information to include within a notification of the incident being compiled to forward to IMS 110. IRDRR module 322 also includes voice-to-text module 330 and biometric verification module 331, which is utilized to authenticate operator 160 and provide access to certain secure functions of MCD 170. As an example, a voice or fingerprint confirmation may be required before allowing an operator/driver to access certain features of IRDRR Module 322, such as insurance carrier claims contact information.

IRDRR Module 322 also includes LE connect module 332 which provides connection protocols (e.g. IP addresses, phone and messaging connection details, etc.) with LE personnel and LE DPS and LE field devices. This allows for quick connection by operator 160 to local law enforcement in the event of an emergency or following an incident. The functionality associated with and/or usage of each of the software modules will become evident by the descriptions provided herein. It is appreciated that the various software modules can be independent modules that communicate with each other via processor execution of respective program code.

MCD 170 also comprises a plurality of input/output (I/O) devices 340. I/O devices 340 include, as input devices, camera 341, microphone 342, touch screen and/or touch pad and/or keypad 343, and biometric sensor 344, and, as output devices, display 345 and speaker 346, among others. I/O devices, and in particular camera 341, can be utilized to capture images (e.g., pictures or video) associated with the incident and store the captured images to local IRDRR DB 318.

According to one aspect of the disclosure and as illustrated by FIG. 3A, MCD 170 supports at least one and potentially many forms of wireless, over-the-air communication, which allows MCD 170 to transmit and receive communication, including location signals, with at least one second device and/or an externally located network. To support wireless communication, MCD 170 includes one or more wireless communication interfaces 360. It is appreciated that MCD 170 can also include components for wired communication, such as modem and Ethernet modules (not shown). Collectively, these wireless and wired components provide a communication mechanism by which MCD 170 can communicate with other devices and networks.

MCD 170 establishes communication with the at least one other device, such as IMS 110, via over-the-air signal transmission, following the exchange of specific authentication and/or access credentials. The communication between MCD 170 and the second devices can be via near field communication, Bluetooth, infrared (IR) transmission, and others, without limitation. As a wireless device, MCD 170 can transmit data over a wireless network (e.g., a Wi-Fi network, cellular network, Bluetooth® network (including Bluetooth® low energy (BLE) networks), a wireless ad hoc network (WANET), or personal area network (PAN)). In one embodiment, MCD 170 may be further equipped with an infrared (IR) device (not pictured) for communicating with other devices using an IR connection. In another embodiment, MCD 170 may include a short-range wireless device, including, but not limited to, a near field communication (NFC) device. In still another embodiment, MCD 170 may communicate with one or more other device(s) using a wired or wireless USB connection. To enable location-based services within/on the device, MCD 170 also includes a location service module, such as a GPS module, without limitation.

FIG. 3B depicts a 2-dimensional view of MCD 170 providing front facing display screen 380 presenting a first IRDRR UI 172. Within IRDRR UI 172 is presented a visual alert notification 382, which can be accompanied by an audible alert, in one embodiment. IRDRR UI 172 also provides notification window 383. Notification window 383 includes a text notification 384 and provides a series of selectable option buttons including first option button 385, which opens (prompts operator to open) a second UI to select a type of incident, second option button 386, which manually activates incident response protocols, and confirmation button 387 to confirm the user selections. In one embodiment, selecting the first option button 385 opens a drop-down menu that presents a series of different types of incidents.

With the above described component makeup and functionality of the operator MCD, one or more embodiments of the disclosure can be described as an MCD, which includes a wireless transceiver that enables connection of the MCD with a shipment tracking service via an external network. The MCD also includes a display device for presenting data and objects within one or more user interfaces. The MCD includes a memory having stored thereon an incident response, data recording, and reporting (IRDRR) module, and a communication module. The MCD includes a storage that stores incident data and shipment-related data and other information. The MCD also includes a processor that is communicatively coupled to each of the wireless transceiver, the display device, the memory, and the storage. The processor executes the IRDRR module, which configures the MCD to receive an input identifying an occurrence of an incident associated with a shipment entity. Execution of the IRDRR module further configures the MCD to, in response to the input, present on the UI one or more selectable incident reporting options to activate IRDRR protocols, and generate and present on the UI an incident response module that instructs the operator of a specific sequence of steps to take to complete an incident information gathering and response process.

Additionally, the program code that configures the MCD to present the selectable reporting options comprises program code that configures the MCD to present, on the display device, a graphical user interface (GUI) object for activating an IRDRR application. Then, in response to user selection of the GUI object, the MCD presents a first incident reporting UI with the one or more selectable incident reporting options. The MCD monitors for receipt of a first trigger that identifies a type of incident and activates a corresponding incident identification and response (IIR) protocol of the IRDRR application based on the selected incident reporting option, and the MCD performs functions of the corresponding incident response protocol in response to receipt of the first trigger.

In one embodiment, the program code that configures the MCD to present the selectable reporting options includes program code that configures the MCD to present, on the UI, at least one of: (a) a series of directives to the operator, the series of directives comprising recommended actions, avoidances, and speech suggestions that limits an exposure of the operator and that directs approved operator behavior in response to the incident; and (b) a checklist of action items to be completed by the operator. Also, when the MCD presents the checklists, the program code further configures the MCD to record operator input indicating completion of items on the checklist, store an operator submitted copy of the checklist with the operator input to local storage along with corresponding incident identifying data, attach the operator submitted copy of the checklist with a notification generated for an IMS of a shipment monitoring system, and forward the notification, including the copy of the checklist, to the IMS.

In one or more embodiments, the program code further configures the MCD to compile incident data to include within/with the notification. Accordingly, the MCD is configured to select, based on one of (a) a received trigger word or phrase within a first voice input that initiates an IRDRR application process and (b) a received selection of a specific incident reporting option within an incident reporting UI, a corresponding notification from among multiple different notifications. In one embodiment, the notification trigger can be a verbal utterance containing specific keywords that identifies a type of incident and/or activates the IRDRR application process. Also, in one embodiment, each notification is associated with a specific one of multiple different types of pre-established trigger words or phrases. The MCD embeds within the notification relevant incident identifying and reporting information including (i) at least one of an MCD identifier and an operator identifier, (ii) a geographic location and time of the incident; and (iii) any additional information inputted by the operator for inclusion within the notification. Then, the MCD attaches to the notification any incident-related audio files or images captured contemporaneously with the incident.

In one or more embodiments, the detection of the incident is automated and triggered by one or more sensors that detect motion and/or impact related to one or more of the shipment entities. With these embodiments, the program code that configures the MCD to receive an input identifying the occurrence of the incident comprises program code that causes the MDC to receive, from a motion sensor, an input identifying one of an impact detection or a sudden abrupt change in velocity of a shipping entity that is indicative of a collision with another object. In response to the detection, the MCD activates the IRDRR application to facilitate incident data collection related to the received input.

According to one embodiment, MCD 170 is configured as or is an electronic logging device (ELD) with integrated emergency response notification features. Accordingly, in addition to the incident reporting features, MCD 170 automates a recording of commercial driving hours, as Hours of Service (HOS) and generates notifications to the driver to ensure the driver adheres to the legal limits.

Referring now to FIGS. 4A-4C, which illustrates a progression of IRDRR UIs from an initial selection of the app icon 405 (FIG. 4A) by operator 160 to entry of specific information related to the incident (FIGS. 4B-4C). The IRDRR module is downloaded as an application and presented, as shown in FIG. 4A, as a selectable icon (405) on display of MCD 170. Selection of IRDRR App icon 405 opens up IRDRR UI 172A-1 on display of MCD 170. IRDRR UI 172A-1 presents incident notification GUI 420 which provides selectable option buttons, including LE connect or Panic button 425, accident/emergency notification button 430, theft of vehicle or cargo button 435, and low-level incident notification button 440. According to one or more embodiments, selection of one of the last three buttons (430, 435, 440) triggers automatic opening of second IRDRR UI 172A-2 (FIG. 4C) which presents incident type confirmation window 450 on the display screen.

IRDRR UI 172A-1 also provides a setup button 442 that allows the operator to customize certain features of the application, such as which insurance company phone number to call, a shipment manifest that links to or populates in identifying information about the shipment-related entities and/or relevant parties, operator's driver's license number, the vessel's VIN number, etc. In one embodiment, the operator is also able to enter special instructions for the operator to follow in addition to the coined or default instructions embedded within the application. In one embodiment, the operator is also able to upload images, such as a picture of a current insurance card, a copy of operator's driver's license, a picture of the vessel, etc. The operator provided information and images are stored within a local IRDRR repository (318) for access when needed during an incident.

According to one embodiment, once a selection is made within incident notification GUI 420, IRDRR module 322 (FIG. 3A) initiates generation of a notification of the incident. Concurrently, IRDRR utility generates a unique incident ID to be utilized to tag the notification being generated to send to IMS. The IRDRR module 322 also captures the time of the incident and the geographic location of the incident to include within the notification. According to one aspect, the amount of detail provided with/within each notification varies, and is dependent on operator selections and entries within subsequent IRDRR windows presented to the operator. An initial basic notification including at least this information along with the identification of the shipment entities and if provided the general type of incident can be transmitted in an initial notification to IMS 110 and/or to law enforcement dispatcher (particularly if LE connect button 425 is activated), in one embodiment.

Referring now to FIG. 4C, Incident type confirmation window 450 presents operator with a list of different selectable options to identify the type of incident that is occurring and the level of severity of the incident. This window (450) allows operator to select the type of incident being reported within the notification. The different input selections are presented on display to prompt the operator to enter the relevant information to begin to allow for gathering of incident data. A representative, but non-exclusive list of these different types of incidents include, without limitation: (i) a vehicle-to-vehicle accident; (ii) a vehicle-to-person accident; (iii) a vehicle-to-animal accident; (iv) a collision involving only the operator vessel (e.g., vehicle to property, road sign, etc.); (v) a vehicle failure that can result in a loss of cargo (e.g., cargo spoilage); (vi) theft of the vehicle; and theft of the cargo. Additionally, priority level selection tab 455 allows operator to select the severity or priority rating of the incident, which selection is optionally included as an additional option for entry, in one or more embodiments. Priority level bar 460 allows for operator selection of a level of priority to ascribe to the incident, from low priority to high (emergency level) priority. For example, a collision with a fatality can be identified with a higher severity than a fender bender, and so on. It is appreciated that the level of priority selected may trigger specific responses and notification of specific other parties, such as law enforcement or an attorney-on-call.

Incident type confirmation window 450 also includes text/audio entry 465 that allows operator to add other descriptive details about the incident using manual texting input, audio file generation, or voice-to-text input. Once operator 160 completes the entry of incident data, operator 160 selects submit button 470 to trigger generation and transmission of a notification to IMS (110) along with the additional incident data embedded within or appended to the notification. Additionally, as provided by the illustrated embodiments, IRDRR UI 172 can include a direct voice connect 415 to a dispatcher associated with IMS, which allows operator 160 to speak directly with someone about the incident in real time.

The above series of prompts and other prompts are presented to encourage or lead operator 160 to provide sufficient detail about the incident for inclusion within the notification. Operator 160 responds to these prompts by entering the corresponding information via direct input (e.g., using touch/keypad), or via device capture, using camera 341, microphone 342, etc. For example, operator 160 may manually enter distinguishing data of the vehicle or the driver of the vehicle and the operator's observations. Also, using camera, operator 160 may capture pictures of the vessel, the third party, the third party driver's license and insurance document, distinguishing features from the third party vehicle, features of the surrounding environment, such as the road conditions, the lighting, etc., contact information from any witnesses, copies of any statements made to law enforcement, etc. It is appreciated that these entries may be via a series of different UIs provided within IRDRR utility 322. The presented UIs are only for example and not intended to be limiting on the disclosure.

In one embodiment, incident type confirmation window 450 remains open for only a preset amount of time before generation/completion and transmission of a notification is triggered. After expiration of the pre-established maximum time for the window (450) to remain open to receive additional operator input, IRDRR utility 322 automatically generates a first notification and transmits the notification to IMS 110. Additional information that is later added by operator 160 can then be transmitted at a later time in a second notification about the incident.

In one or more embodiments, following entry of the type of incident in incident type confirmation window 450, IRDRR module 322 configures MCD 170 to present at least one of: a list of Dos and Don'ts for the operator to read and follow, the Dos and Don'ts corresponding to the identified type of incident; and specific prompts advising the operator what to say and what not to say and what information to share with a third party and law enforcement personnel.

In one or more embodiments, the IRDRR module 322 configures the MCD 170 to present at least one of: a list of Dos and Don'ts for the operator to read and follow, the Dos and Don'ts corresponding to the identified type of incident; and specific prompts advising the operator what to say and what not to say and what information to share with a third party, including law enforcement personnel and emergency response personnel.

FIGS. 4D-4E illustrates two additional IRDRR UIs 172B-1, 172B-2, which present operator directives within a traffic accident protocol (TAP). IRDRR UIs 172B-1 and 172B-2 respectively present TAP Windows 475, 480. TAP Windows 475, 480 respectively provide a listing of Dos and Don'ts that are presented to operator 160 following an incident that involves a vehicular accident. TAP Windows 475, 480 are generated and presented on display when one or more of the operator's inputs in the incident reporting UI 420 or incident type confirmation window 450 (or an initial trigger phrase) indicates that the incident is a vehicular accident with another vehicle. In one embodiment, each of TAP windows 475, 480 provides personal action items entry that allows operator 160 to include a few personal reminders and edit the reminders. This feature allows for customizing each TAP window 475, 480 for the particular operator.

FIG. 4F provides another IRDRR UI 172C with a third TAP window 485 presenting a checklist for operator completion. According to one embodiment, the checklist presents a series of action prompts that indicate what steps the operator needs to complete when in an accident to ensure the required information is shared and/or collected. Several of the items require an image to be captured. In the illustrated embodiment, these items further include a selectable camera icon that when selected, activates the camera function of the MCD and allows for capture of photographs or video. The captured images are tagged with the incident ID and stored along with the other information related to the incident within local IRDRR repository (318). The driver's license item includes a location for manual or voice entry of the driver's license of the driver of the other vehicle. Each item in the list has a selection option to indicate when the item has been completed. As shown in TAP window 485, the first two and the fifth items in the sequence have been checked off as completed. It is appreciated that the submitted checklist can be fully or partially complete in one embodiment. However, in an alternate embodiment, the completion of all items may be required before submission can occur.

According to one or more embodiments, operator 160 may toggle between the different windows (475, 480, 485) and a home or menu window by selecting one of the toggle buttons provided at the bottom of the UI or by swiping left or right on MCD.

While only specific types of IRDRR UIs have been presented, it is understood that this presentation is for illustration only. Other types of UIs with different types of information may be provided to the operator, in part based on the operator entries in incident reporting UI 420 or incident type confirmation window 450 and in part based on what information IMS 110 determines to be of importance to communicate to the operator for the specific types of incidents the operator may encounter. Accordingly, a periodic analysis can be performed to identify what information is best to be presented to the operator and, based on that analysis, the presented information can be updated from time to time within IRDRR module 322.

Figure 5:
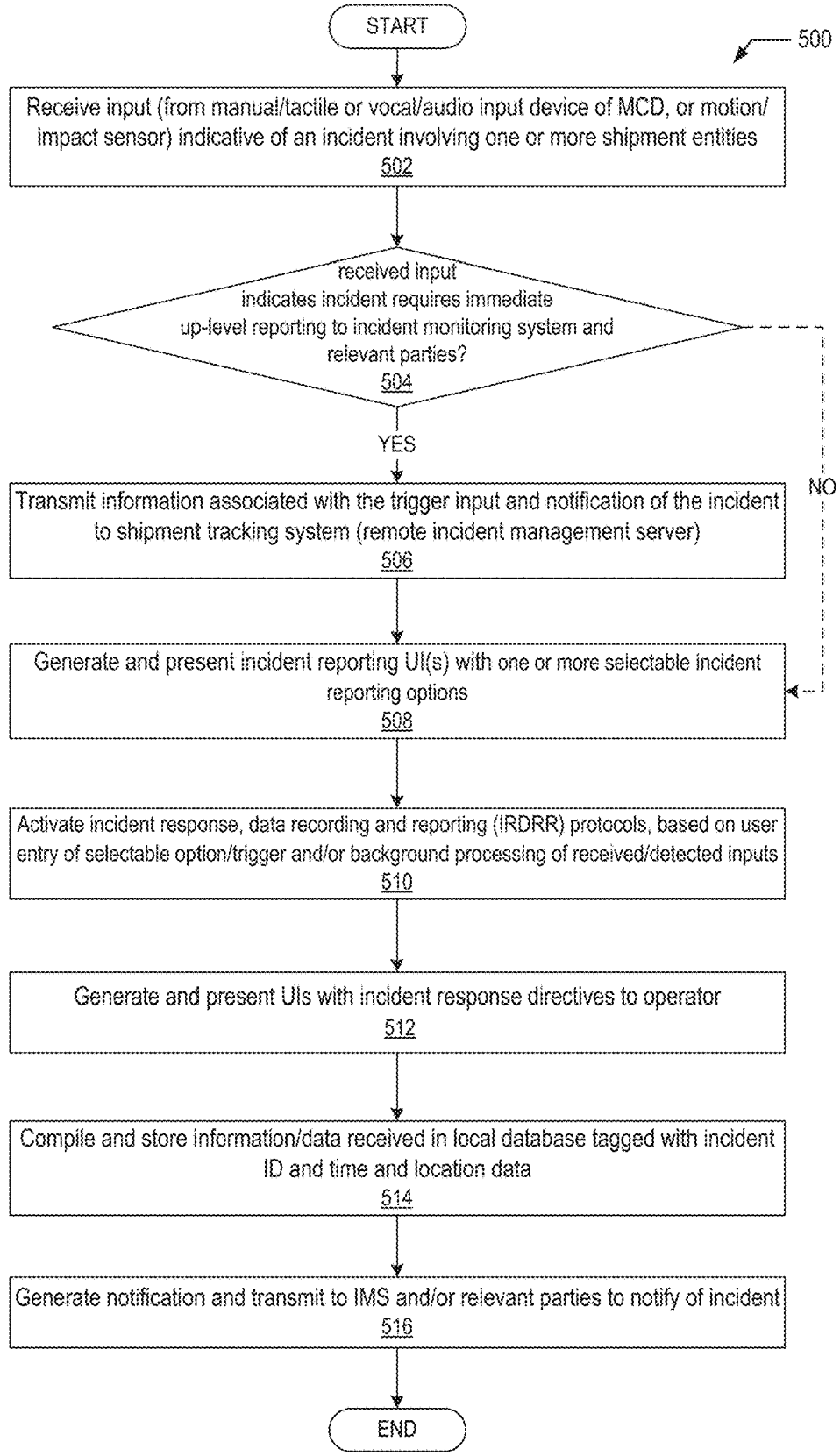
FIG. 5 is a flow chart illustrating a method for automated incident processing, data capture and reporting, and guiding operator actions and response, in accordance with a plurality of embodiments.
Figure 6:
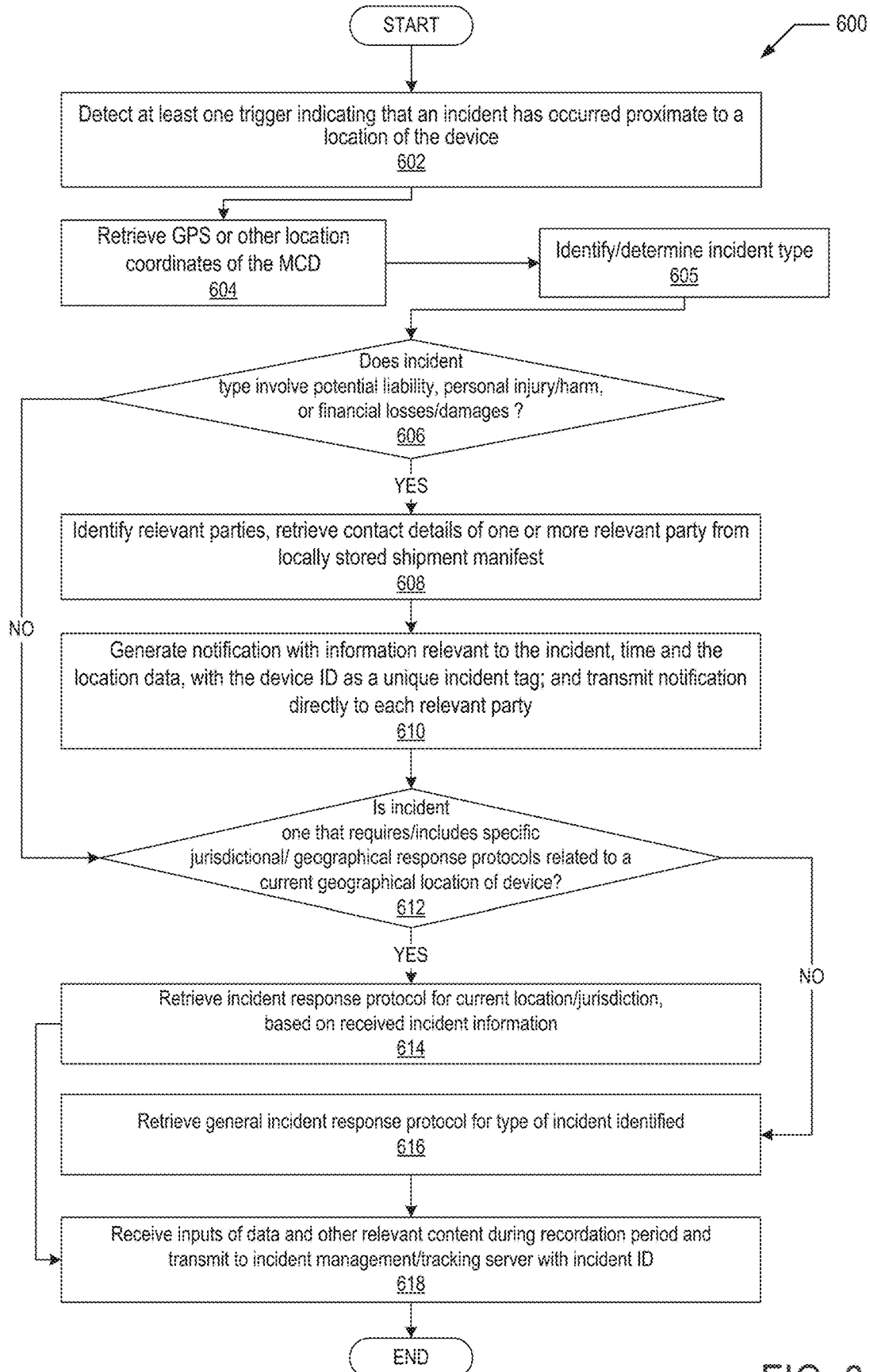
FIG. 6 is a flow chart illustrating a method for determining which incident response UIs to present to the operator and which notifications to generate based on a type of incident, in accordance with one or more embodiments.

With reference now to the flow charts of FIGS. 5-6, there are presented methods 500-600 by which MCD 170 performs certain of the features of the disclosure. According to one aspect, the completion of each method involves execution of the program code of IRDRR module 322 by processor of MCD 170. When executed by processor 310, IRDRR module configures the MCD to perform the functions and features of the methods 500-600. Thus, certain of the method features are presented as being performed by MCD 170 generally. Within each flow chart, certain features that are considered optional are presented in blocks having dashed lines. These features can be included in some embodiments and excluded in others. It is appreciated that the described aspects of the various methods can be fully automated, in one or more embodiments, or be partially automated in some embodiments.

Method 500 begins at the start block and transitions to block 502 which includes receiving an input identifying an occurrence of an incident associated with a shipment entity. The shipment entity is one or more of a vessel, an operator, and a cargo being transported via the vessel. In one embodiment, the incident can be an emergency condition requiring immediate dispatch of emergency personnel.

According to one embodiment, the input is a first voice input that is audibly detected while the MCD is in an always-on listening mode. In this embodiment, method 500 includes receiving the first voice input and comparing content within the first voice input to a set of pre-established incident trigger words or phrases that identifies at least one specific type of incident. The set of trigger words or phrases can be stored within the memory of the MCD or on a remote database, wirelessly accessible to the MCD. This audio-activated embodiment of method 500 also includes, in response to detecting a match of the content of the first voice input with one or more of the pre-established incident trigger words or phrases, triggering activation of IRDRR application processing to record and report the specific type of incident identified within the content of the first voice input and activate the incident response protocols for the operator.

As one example of the audio-activated embodiment, the security/emergency feature is voice activated by a pre-established code word or phrase, e.g., "Overhaul Help Me". In one embodiment, method 500 includes, in response to detecting a match of the content within the received audio with one or more of the trigger words or phrases, initiating a connection with a shipment tracking service, which operates as a background shipment tracking and notification service.

In yet another embodiment, receiving an input identifying the occurrence of the incident includes receiving, from a motion sensor, an input identifying one of an impact detection or a sudden abrupt change in velocity of a shipping entity that is indicative of a collision with another object. With this embodiment, method 500 includes activating the IRDRR application to facilitate incident data collection related to the received sensor input.

In one embodiment, method 500 includes a determination (decision block 504) of whether the received input indicates that the incident requires an immediate reporting to the incident monitoring system and relevant parties, without additional data collection and/or a manual submission by the operator. In response to the received input identifying the incident as one that does require immediate reporting, method 500 then automatically transmits the information associated with the trigger input and the notification of the remote incident IMS of the remote shipment tracking system (block 506).

At block 508, method 500 includes, in response to the input, presenting on a user interface (UI) of an operator mobile communication device (MCD) one or more selectable incident reporting options to activate incident response, data recording, and reporting (IRDRR) protocols. In one embodiment, the incident reporting option can be a selectable icon or other selectable item, such as a visual emergency button. According to one embodiment, presenting of the selectable reporting options includes presenting, on a display of the MCD, a graphical user interface (GUI) object for activating an IRDRR application and, in response to user selection of the GUI object, presenting a first incident reporting UI with the one or more selectable incident reporting options. The presenting of the selectable reporting options further includes monitoring for receipt of a first trigger that identifies a type of incident and activates a corresponding incident identification and response (IIR) protocol of the IRDRR application, based on the selected incident reporting option. When visually presented as a selectable item on a touch screen interface of the MCD, the incident reporting function(s) can be physically activated via a touch input on the touch screen of the MCD. In one embodiment, the functionality associated with the incident reporting function(s) can be verbally triggered by an audio input received or detected via a microphone of the MCD. In one or more embodiments, MCD 170 maintains multiple different response protocols associated with different types of incidents. With these embodiments, MCD 170 performs additional background processing via execution of a response protocol selection module. With both embodiments, the method includes monitoring for receipt of a first trigger that activates an emergency function of the IRDRR module 322. The presenting of the selectable reporting options then includes performing/activating the corresponding incident response protocol in response to receipt of the first trigger (block 510). FIG. 6, which is described below, provides one embodiment of method 600 by which the protocol selection process is completed.

Method 500 further includes generating and presenting via the UIs one or more incident response modules that instruct the operator of specific sequence of steps to take to complete an incident information gathering and response process (block 512). According to one embodiment, presenting the incident response module includes presenting, on the UI, a series of directives to the operator, the series of directives comprising recommended actions, avoidances, and speech suggestions that limits an exposure of the operator and that directs approved operator behavior in response to the incident. The UIs provide detailed information to the operator about what data to collect, how to collect the data (i.e., using manual entry, image capture, and/or audio capture), the sequence for collecting the data, "Do's and Don'ts", and what information should be provided to relevant parties, to third parties, to law enforcement, and to emergency personnel, etc. According to one or more embodiments, presenting the incident response module further includes presenting, on the UI, a checklist of action items to be completed by the operator. Method 500 also includes recording operator input indicating completion of items on the checklist and storing an operator-submitted copy of the checklist with the operator input to local storage along with corresponding incident identifying data. Method 500 then includes attaching the operator submitted copy of the checklist with a generated notification and forwarding the notification including the copy of the checklist to an incident management service.

According to another embodiment, presenting the incident response module includes one or more of (i) presenting a list of Dos and Don'ts for the operator to read and follow, the Dos and Don'ts corresponding to the identified type of incident and (ii) presenting specific prompts advising the operator of approved and relevant statements to say and what information to share with a third party, including with law enforcement personnel and other emergency response personnel.

In yet another embodiment, presenting the incident response module includes (i) outputting a request for the operator to capture incident-related images via at least one of photographs and video, the request comprising information identifying specific types of detail that are relevant and are to be captured in the incident-related images, (ii) detecting capture of one or more images contemporaneously with the incident, and (iii) storing the one or more images along with an incident identifier as the incident-related images. According to one related aspect, the method includes, in response to detecting capture of the one or more images, tagging the one or more images with the incident identifier. The method further includes storing the one or more images along with the incident identifier as the incident-related images and forwarding the incident-related images along with a notification of the incident to an incident reporting service. The forwarding of the incident-related images includes automatically uploading any images captured contemporaneously with detection of the incident to the incident reporting service for storage within an incident tracking database.

Also, in one embodiment, the IMS responds to receipt of the contemporaneously-captured photographs by tagging the photographs with a location and a time of capture and associating the stored photograph with an entry created for the incident within the shipment tracking system database, the entry comprising operator and carrier identifying information and any additional details about the cargo being transported that is relevant to creating a substantially complete history of the incident. It is appreciated that, in one or more embodiments, contemporaneously captured data may be received at a later time and may be received from a third party witness, the other party, law enforcement or emergency response personnel, a traffic camera, etc., without limitation.

According to one embodiment, presenting the incident response module includes presenting a selectable audio recording button to activate audio recording of events occurring contemporaneously with the incident. In response to operator selection of the audio recording button, method 500 further includes activating a recording function of the MCD, the activating including presenting a visual indication of an active recording process. Method 500 also includes setting a timer for the recording to terminate, then monitoring the timer by comparing the elapsed timer with a pre-established maximum recording time threshold. Method 500 then includes, in response to one of (a) the timer expiring or reaching the pre-established maximum recording time threshold or (b) receipt of a manual input to stop the recording, terminating the audio recording. Method 500 further includes tagging the audio recording with an incident ID to generate an incident-related audio file, storing the incident-related audio file to local storage. Method 500 also includes forwarding the incident-related audio file along with a notification of the incident to the incident reporting service for storage with an entry for the incident within an incident tracking database. Accordingly, an audio recording of any verbal communication and interaction with law enforcement and other third parties associated with the incident is acquired in real time and made available for access by relevant parties, such as an insurance adjuster or company, or a legal representative of the operator or insurance company.

According to one embodiment, the method includes compiling and storing incident data within a local database for inclusion within/with a notification (block 514). At block 516, method 500 includes generating a notification of the incident and transmitting the notification to IMS 110 and/or to relevant parties to notify the relevant parties of the incident. According to one aspect, prior to transmitting the notification, method 500 includes initiating a connection of the MCD with an incident management server of an incident reporting service within a shipment tracking system. Transmitting the notification also includes transmitting the notification to the IMS. Method 500 then ends.

In the audio-activated embodiments, method 500 includes transmitting a distress/notification signal to the shipment tracking service (e.g., Overhaul fusion hub), where the distress/notification signal corresponds to the specific type of word/phrase detected. The distress/notification signal includes the identification (ID) of the MCD and other relevant information, such as, the location of the vessel/cargo/MCD, the identification of the operator associated as the user of the MCD, the cargo information associated with the specific shipment being transported by the operator, etc. The background shipment tracking service is configured to respond to receipt of certain received trigger phrases or distress/notification signals to provide notification to relevant parties and store data corresponding to the incident within an incident database.

In one or more embodiments, the background service is further configured to respond to receipt of certain received trigger phrases or distress/notification signals by performing a check on the operator. In one embodiment, the check includes initiating a call to the operator MCD, which queries the operator to respond to the call and provide a real-time update on the emergency situation.

In one embodiment, in which a verbal input is received to trigger activation of the IRDRR application, the compiling of the incident data and generating of the notification includes selecting, based on one of (a) a received trigger word or phrase within a first voice input that initiates an IRDRR application process and (b) a received selection of a specific incident reporting option within an incident reporting UI, a corresponding notification from among multiple different notifications, where each different notification is associated with a specific one of multiple different types of incidents identified by different pre-established trigger words or phrases or different selectable options. The compiling includes embedding within the notification relevant incident identifying and reporting information comprising (i) at least one of an MCD identifier and an operator identifier, (ii) a geographic location and time of the incident; and (iii) any additional information inputted by the operator for inclusion within the notification. The compiling further includes attaching to the notification any incident-related audio files or images captured contemporaneously with the incident.

Referring now to FIG. 6, there is illustrated method 600 for completing background processing by IRDRR module 322 to identifying which IRDRR protocols to activate and/or which UIs to present to operator. Method 600 is performed by MCD 170 executing an incident response protocol selection module within IRDRR module 322. Method 600 begins at start block and transitions to block 602 which provides MCD 170 detecting at least one trigger indicating that an incident has occurred proximate to the location of the device and/or the shipment. Method 600 includes retrieving GPS or other location coordinates of the MCD and/or the shipment (block 604). Method includes identifying and/or determining the type of incident (block 605).

According to one aspect, the method includes determining the type of incident from among a pre-established listing of incident types that can occur with the shipment. At decision block 606, method 600 determines if an identified incident type is one that involves potential liability, personal harm or injury to the operator or another person, or financial losses or other damages. Specifically, in one or more embodiments, method 600 includes identifying when the incident is a liability-attaching incident, such as with vehicular accidents, that can result in liability of the operator or shipper potential financial or other damages, or other losses that would be covered by an insurance carrier. And, in response to the incident being a liability-attaching incident, the method includes triggering an instantiation of the IRDRR application, identifying each relevant party (e.g., each financially responsible party that may be affected by the liability-attaching incident) and retrieving the contact information for the identified relevant party (block 608). Th method then includes generating the notification of the incident and transmitting the notification directly to the relevant party with an incident report that is compiled from data collected contemporaneously with the occurrence of the incident (block 610). In one embodiment, the relevant party is identified within one or more of (i) a locally-stored copy of the shipment manifest, (ii) a pre-entered phone number and/or email address for an insurance company having an interest in one or more of the shipping entities, and (iii) entries of contact information associated with specific relevant parties provided within a local copy of IRDRR module 322. In one or more related embodiments, method 600 includes identifying whether a response is received to the notification provided to one or more of the relevant parties. Method 600 then includes initiating and or displaying on MCD 170 the response that is received from the relevant party.

At decision block 612, method includes determining whether the incident is one that requires specific jurisdictional response protocols related to a current geographic location of the MCD and/or the shipment. In response to the incident requiring a localized response, method 600 includes retrieving incident response protocols for a current local jurisdiction and/or location based on the received incident information (block 614). Otherwise, method 600 includes retrieving general incident response protocol for the type of incident that is identified (block 616). Method 600 then includes receiving inputs of data and other information during a recordation period (e.g., 30 minutes after detection of the incident) and transmitting the received data, tagged with the incident ID, to the incident tracking database (block 618).

According to one or more embodiments, the collection of data related to the incident can continue beyond the initial recordation period. The operator is able to enter additional information at a later time and to tag that information as being associated with the incident. The later added information is stored locally and transmitted to the IMS as additional data for inclusion in the incident record maintained at the IMS database. Additionally, in one or more embodiments, some incident data collection is automated with the use of sensors and or other components of MCD 170, such as the camera and microphone. Additional sensors may exist on or around the vessel and automatically triggered to turn on an transmit the sensed data to MCD. These components can be automatically turned on to capture additional details without express user interaction.

Figure 7A:
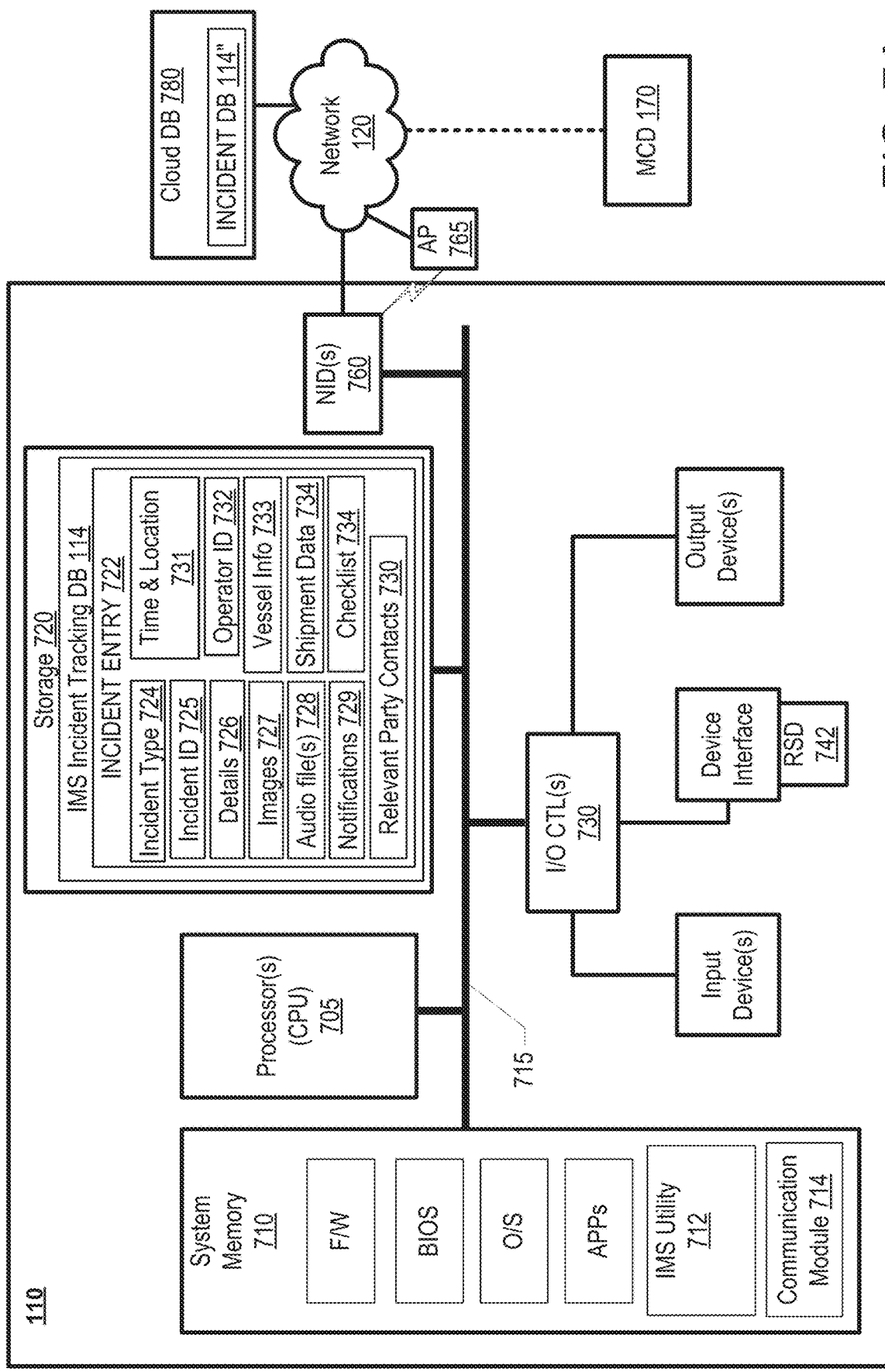
FIG. 7A illustrates an example server data processing system (DPS) that operates as a remote shipment tracking and notification system providing incident management server functionality to support incident data recording, storage, and reporting to relevant parties, in accordance with one or more embodiments.

Turning now to FIG. 7A, there is illustrated a block diagram representation of an example shipment monitoring data processing system (DPS) within which various aspects of the disclosure can be implemented. DPS 110 can be one server within a cluster of servers, where the servers can be co-located in a single location and/or geographically dispersed over a plurality of locations in a distributed system. In other embodiments, DPS 110 can be any electronic device such as, but not limited to, a desktop computer, notebook computer, or a single server. Additionally, in one embodiment, DPS 110 can be implemented as a virtual machine sharing hardware resources of a physical server. In one embodiment, DPS 110 operates as a networked computing device providing a cloud infrastructure that supports implementation of a carrier and shipper interfacing and shipment tracking (CSIST) framework. Generally, DPS 110 can operate as both a data aggregator and/or a monitoring center computer. As a data aggregator, DPS 110 receives additional amounts of information from shipment-related entities to enable other features and functionalities. As a monitoring center computer, DPS 110 can be configured with additional software and firmware modules and components for receiving data, generating notifications, and responding to detected conditions within a shipment monitoring environment. For purposes of this disclosure, DPS 110 is representative of IMS 110 and is interchangeably referred to as IMS herein. It is appreciated that, as shown within FIG. 7, IMS 110 can simply be any DPS equipped with IMS utility 712 and corresponding IMS incident tracking DB 114.

Example DPS 110 includes at least one processor, and potentially a plurality of processors, generally referenced hereinafter as central processing unit (CPU) 705. CPU 705 is coupled to system memory 710, non-volatile storage 720, and input/output (I/O) controllers 740 via system interconnect 715. System interconnect 715 can be interchangeably referred to as a system bus, in one or more embodiments. One or more software and/or firmware modules can be loaded into system memory 710 (from storage 720 or other source) during operation of DPS 110. Specifically, in the illustrative embodiment, system memory 710 is shown having therein a plurality of software/firmware modules, including firmware (F/W), basic input/output system (BIOS), operating system (OS), and application(s). Additionally, system memory 710 includes IMS utility 712 and communication module 716. While shown as a separate component, IMS utility 712 can, in alternate embodiments, be provided as one of the applications and/or as an executable module within F/W, for example. The software and/or firmware modules within system memory 710 enable DPS 110 to provide varying features and functionality when their corresponding program code is executed by CPU 305 or by secondary processing devices (not specifically shown) within DPS 110.

Local storage 720 stores a local copy of IMS incident tracking DB 114, which is a repository of data related to the incidents reported by one or more operator MCDs within the larger shipping network. DB 114 includes a plurality of incident entries, each tagged with a specific unique incident ID. Example incident entry 722 is illustrated. As shown, incident entry 722 includes the following data/information, without limitation: incident type 724, Incident ID 725, details entered by operator 726, images captured by operator and others 727, audio files 728, notifications 729, time and location data 731, operator ID 732, vessel information 733, shipment data 734, checklist 734, and relevant party contacts 730. Remote cloud DB 780 includes remote copy of incident tracking database 114".

Figure 7B:
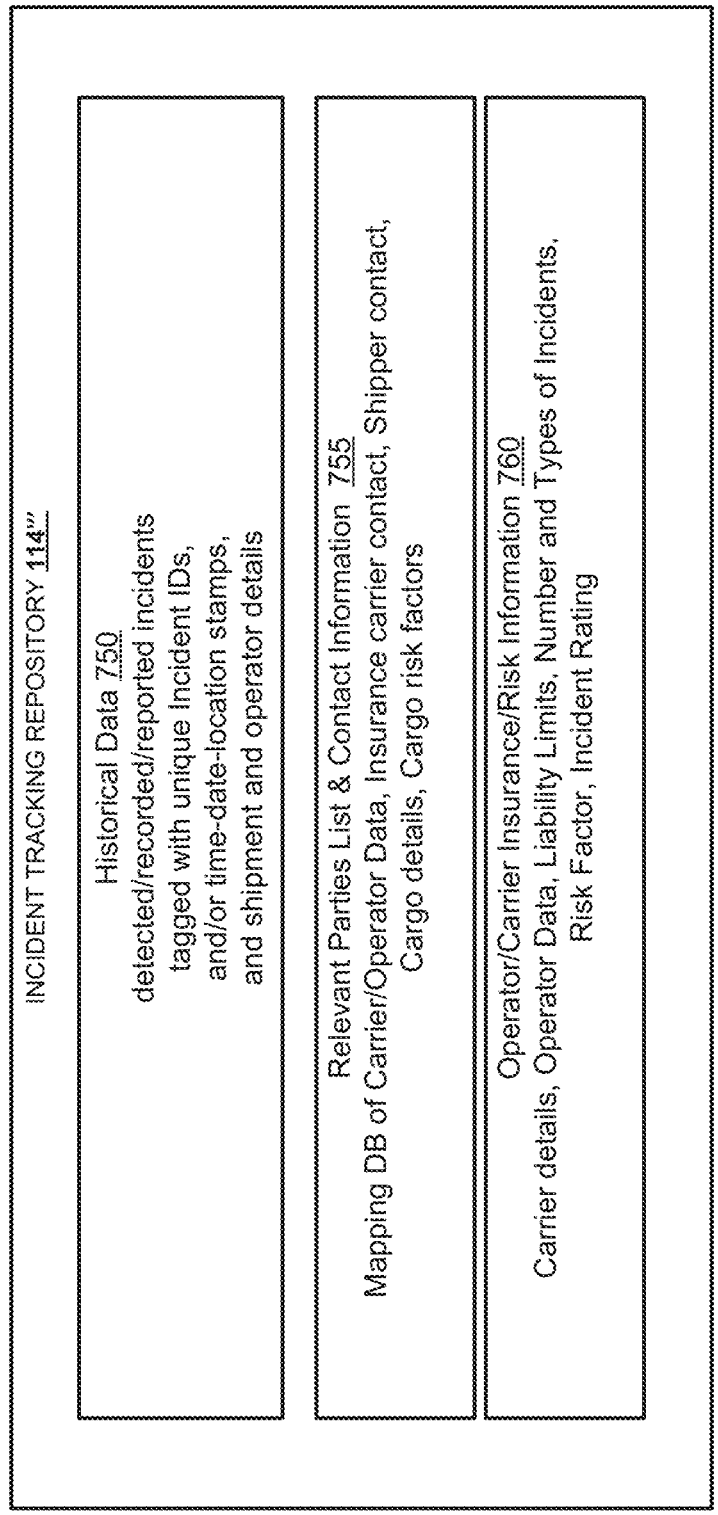
FIG. 7B is a block diagram representation of an incident recording database that combines received incident data for each incident in a single entry for historical tracking and access for claims processing and/or litigation, according to one or more embodiments.

FIG. 7B illustrates another example of content that can be stored within incident tracking repository 114. The content is presented as three main sets of data: historical incident entries 750; relevant party notification list 755; and carrier insurance/risk information 760. Relevant party notification list 755 includes a name listing with contact information (e.g., emails and phone numbers) for each relevant party (i.e., having an interest in one or more of the cargo, vessel, and/or operator) to an incident involving the particular shipment. When an incident involving potential liability and financial costs to one or more of the insured shipping entities occurs, the relevant parties list is expanded to include the insurance carrier and insurance adjusters. Operator/carrier insurance/risk information 760 can include historical information linking the particular carrier or operator to a risk factor (e.g., cost to shipper or insured) that is based on the number of incidents reported over a period of time (e.g., from when incident tracking begins).

Referring again to FIG. 7A, I/O controllers 740 support connection by and processing of signals from one or more connected input device(s). I/O controllers 740 also support connection with and forwarding of output signals to one or more connected output devices. I/O controllers 740 can also provide a device interface to which one or more removable storage device(s) (RSD(s)) 742 can be received. In one or more embodiments, RSD 742 is a non-transitory computer program product or computer readable storage device. In accordance with one embodiment, the functional modules (e.g., IMS utility 712) described herein and the various aspects of the disclosure can be provided as a computer program product. The computer program product includes one or more RSDs 742 as a computer readable storage medium on which is stored program code of IMS utility 712. When executed by a processor (e.g., CPU 705), the program code of IMS utility 712 causes the processor to implement the IMS functions described herein, including, but not limited to, the features illustrated within method 800 of FIG. 8, which is described below.

DPS 110 further includes network interface device (NID) 760, which enables DPS 110 and/or components within DPS 110 to communicate and/or interface with other devices, services, and components that are located external to DPS 110. In one or more embodiments, DPS 110 connects to remote database (DB) 780, via external communication network(s) 120, using one or more communication protocols. Remote DB 780 can be a cloud storage, in one embodiment, and can include a copy of incident tracking repository (114). For purposes of discussion, communication network 120 is indicated as a single collective component for simplicity. However, it is appreciated that communication network 120 can comprise one or more direct connections to other devices as well as a more complex set of interconnections as can exist within a wide area network, such as the Internet.

As one aspect of the disclosure, IMS utility 712 includes program code that execute on CPU 705 to configure IMS 110 to performs functions that include receiving incident data, compile the received incident data, and create data entries within an incident tracking repository. DPS 110 incorporated into shipment monitoring system as IMS 110 executes IMS utility 712 to provide server-level incident tracking functionality presented herein. Accordingly, a shipment incident system is provided that includes a network interface enabling communication with a plurality of operator mobile communication devices (MCDs) via a network. The shipment incident tracking system further includes at least one incident management server (IMS) that is communicatively coupled to the network and which is communicatively coupled to at least one operator MCD. The IMS includes a memory having stored thereon an IMS utility and a processor that executes the IMS utility. Processor execution of the IMS utility configures the at least one DPS to perform the processes indicated as method 800 depicted by FIG. 8.

Figure 8:
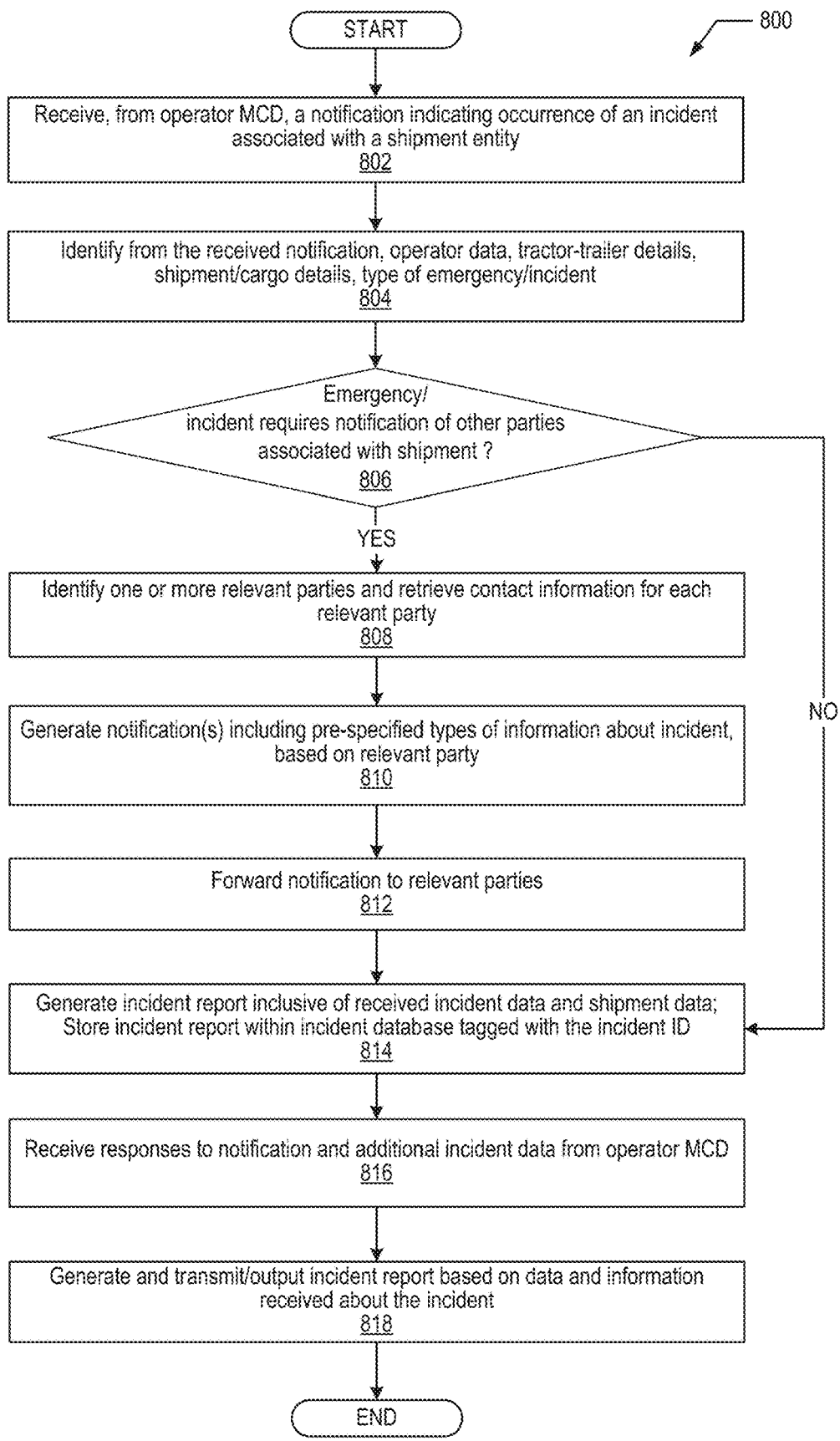
FIG. 8 provides a flow chart illustrating a method by which image management server processes and responds to received incident notifications and data, in accordance with one or more embodiments.

Turning now to FIG. 8, method 800 begins at start block and proceeds to block 802 at which IMS 110 receives, from an operator MCD, a notification of an incident involving at least one shipment entity. Method 800 includes IMS 110 parsing the notification to identify shipment data (operator, vessel, and/or cargo data) and the type of incident (block 804). Method 800 includes identifying, at decision block 806, whether the incident is an emergency or an incident that requires notification of other relevant parties. Once incident notification is received at/by the IMS 110, IMS 110 identifies, based on the type of incident that has occurred and the shipment related parties, any relevant parties to be notified. In one specific embodiment, this process includes identifying whether the incident is a liability-attaching incident. Then, in response to the incident being one that requires notification of other relevant parties (e.g., an emergency and/or a liability-attaching incident), method 800 includes identifying, based on the type of incident that has occurred, specific parties relevant to the incident and to the shipment and retrieving the contact information of the relevant parties that require notification and/or information about the incident (block 808).

Generally, relevant parties can include the monitoring service personnel, the shipper, the carrier, an intended recipient of the cargo, an insurance adjuster, each insurance company insuring one or more of the shipper, cargo, carrier, operator, trailer-tractor, the end-recipient, law enforcement, emergency response personnel, etc. According to one aspect, the relevant parties can be a different set parties for each type of incident and, in part based on the shipment entities associated with the shipment being monitored. With any liability-attaching incident that potentially involves insurance payments, the relevant parties include an insurance adjuster and any insurance company insuring one or more of the shipment, the carrier, and the operator.

Method 800 further includes generating one or more notifications that include pre-specified types of information/detail about the incident, based on the relevant party receiving the notification (block 810). Method 800 then includes forwarding the notification to the relevant parties (block 812). In one or more embodiments, IMS 110 forwards to the relevant parties specific information about the incident, including information that may be predetermined or pre-established as required by the relevant party whenever the specific type of incident is recorded.

In one or more embodiments, the program code that enables the processor to parse the notification further includes code that configures the DPS to digitally compile an incident report, which includes information from the incident data and shipment data and later-received claims data. The DPS stores the incident report in the IMS database, then forwards the compiled incident report to the relevant parties, including a claims adjuster, an insurance company, the shipper, etc. In one embodiment, additional details such as the cargo being transported may be appended to the entry stored in the shipment tracking system database. Method 800 thus includes creating an incident report including relevant information about the incident received with the notification and subsequent or contemporaneous data received about the incident, and storing the incident report within an entry of the incident tracking database (block 814). Method 800 includes receiving responses from the relevant parties and/or additional data from the operator MCD (block 816). Method 800 then includes updating the incident report with the subsequently received (i.e., later-in-time) additional information related to the incident and/or the responses thereto (block 818). Method 800 then ends.

In the example of a traffic related accident, the server compiles and shares claims data digitally with the relevant interested parties, such as a claims adjuster, shipper, and/or insurance company. In one embodiment, the location and time of the incident is also shared, as soon as the incident occurs. In one embodiment, this sharing can be completed directly via the application on operator MCD.

Additionally, in one embodiment, the program code further includes code that configures the IMS to respond to receipt of the notification signals by performing a health check on the driver. IMS 110 initiates (or triggers the initiation of) a call to the MCD to query the operator to provide a real-time, live update on whether the incident involves an emergency situation. In one or more embodiments, IMS 110 also first verifies the operator by requesting the operator provide a specific passphrase, security code, and/or biometric response within a prescribe period of answering the call. In response to not receiving an answer to the phone call from the operator or in response to the operator not being able to provide the required biometric or other security confirmation, IMS 110 escalates the situation by communicating with a local first responder or emergency dispatch.

As described above, a method and system are provided for implementing an incident response protocol that enables real-time capture and upload, via a mobile communication device (MCD), of relevant incident-related information and secondary data following confirmation of the incident involving one or more of the operator, cargo, transport vessel, and shipment route. The method includes executing, via a processor of the mobile communication device, the IRDRR module to retrieve and present a series of UIs with prompts and directives on the display of the MCD, including a digital workflow that is designed to walk the driver through a road traffic accident information-gathering exercise. Implementation of the features of the described method helps to reduce the financial losses tied to filing of frivolous lawsuits, in one aspect. Also, implementation of the disclosure enables relevant data to be immediately collected and communicated to parties who will be involved in ascertaining what really happened and how to attribute or limit liability of the operator.

In each of the above flow charts presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In at least one embodiment, aspects of the disclosure are provided as a computer program produce that includes a computer readable medium and program code stored on the computer readable medium that when installed on and executed by a processor of a computer device, such as the MCD or IMS, having a display configures the computer device to respectively perform the method functions illustrated by FIGS. 5-6 and 8.

As further described herein, implementation of the functional features of the disclosure described herein can involve use of a combination of hardware, firmware, as well as several software-level constructs (e.g., program code and/or program instructions and/or pseudo-code) that execute to provide a series of methods that present the different features and functions of the disclosure. As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

In the above description, exemplary embodiments in which various aspects of the disclosure may be practiced are described in general detail to enable those skilled in the art to practice the invention. It is to be understood that other embodiments may be utilized and that logical, architectural, programmatic, mechanical, electrical and other changes may be made without departing from the spirit or scope of the present disclosure. The above description is an extended summary and therefore, should not to be taken in a limiting sense, and the scope of the present disclosure will be defined by appended claims and equivalents thereof. Other aspects of the disclosure that stem from and/or are extensions of the above described processes are presented generally within the aforementioned descriptions and/or the figures accompanying this submission. Nothing within the present descriptions are to be taken as limiting on the scope of the greater application of the disclosure within the shipping and transportation industry/space.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

While the disclosure has been described with reference to exemplary embodiments, it will be understood by those skilled in the art that various changes may be made, and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. Many modifications and variations will be apparent to those of ordinary skill in the art without departing from the scope and spirit of the innovation. The described embodiments were chosen and described in order to best explain the principles of the innovation and the practical application, and to enable others of ordinary skill in the art to understand the innovation for various embodiments with various modifications as are suited to the particular use contemplated.

What is claimed is:

1. A method for automated incident processing and response, the method comprising:
  receiving an input identifying an occurrence of an incident associated with a shipment entity, the shipment entity being one or more of a vessel, an operator, and a cargo being transported via the vessel;
  in response to the input, presenting on a user interface (UI) of an operator mobile communication device (MCD), one or more selectable incident reporting options to activate incident response, data recording, and reporting (IRDRR) protocols;

generating and presenting on the UI an incident response module that instructs the operator of specific sequence of steps to take to complete an incident information gathering and response process;

presenting a list of Do's and Don'ts for the operator to read and follow, the Do's and Don'ts corresponding to an identified type of incident;

presenting specific prompts advising the operator what not to say and directives comprising speech suggestions that limits an exposure of the operator;

transmitting to an incident management server (IMS) of a shipment tracking system a notification of the incident involving the shipment entity;

in response to the notification, receiving a phone call from the IMS to complete a health check on the operator, the health check comprising a query to provide a real-time, live update on whether the incident involves an emergency situation, wherein the IMS escalate situation by communicating with a local first responder or emergency dispatch, in response to not receiving an answer to the phone call;

in response to the operator answering the phone call, presenting a query to verify the operator by requesting the operator provide a specific passphrase and/or security code within a prescribe period of answering the phone call; and in response to the operator not being able to provide the specific passphrase and/or security code, triggering the IMS to escalate situation by communicating with a local first responder or emergency dispatch.

2. The method of claim 1, wherein the presenting of the selectable reporting options comprises:

presenting, on a display of the MCD, a graphical user interface (GUI) object for activating an IRDRR application;

in response to user selection of the GUI object, presenting a first incident reporting UI with the one or more selectable incident reporting options;

monitoring for receipt of a first trigger that identifies a type of incident, from among a pre-established listing of incident types that can occur with the shipment entity, and activates a corresponding incident identification (IIR) protocol of the IRDRR application based on the identified type of incident; and performing the corresponding incident identification and response protocol in response to receipt of the first trigger.

3. The method of claim 1, wherein presenting the directives comprises:

presenting, on the UI, a series of situation-appropriate directives to the operator, the series of directives further comprising recommended actions and avoidances that limits an exposure of the operator and that directs approved operator behavior in response to the incident.

4. The method of claim 1, wherein presenting the incident response module comprises:

presenting, on the UI, a checklist of directives to be completed by the operator;

recording operator input indicating completion of items on the checklist;

storing an operator submitted copy of the checklist with operator input to local storage along with corresponding incident identifying data;

attaching the operator submitted copy of the checklist with a notification generated for an incident management service; and forwarding the notification, including the copy of the checklist, to the incident management service.

5. The method of claim 4, further comprising compiling incident data to include within/with the notification, the compiling comprising:

selecting, based on a received trigger word or phrase within a first voice input that initiates an IRDRR application process, a corresponding notification from among multiple different notifications, each different notification associated with a specific one of multiple different types of incidents identified by different pre-established trigger words or phrases or different selectable options;

embedding within the notification relevant incident identifying and reporting information comprising (i) at least one of an MCD identifier and an operator identifier, (ii) a geographic location and time of the incident; and (iii) any additional information inputted by the operator for inclusion within the notification; and attaching to the notification any incident-related audio files or images captured contemporaneously with the incident.

6. The method of claim 1, wherein presenting the incident response module comprises:

presenting specific prompts advising the operator what to say and what information to share with a third party, including law enforcement personnel.

7. The method of claim 1, wherein presenting the incident response module comprises:

outputting a request for the operator to capture incident-related images via at least one of photographs and video, the request comprising information identifying specific types of detail to be captured in the incident-related images;

detecting capture of one or more images contemporaneously with the incident; and storing the one or more images tagged with an incident identifier as the incident-related images.

8. The method of claim 7, further comprising:

in response to detecting capture of the one or more images, tagging the one or more images with the incident identifier; and forwarding the incident-related images along with a notification of the incident to an incident reporting service, wherein the forwarding of the incident-related images comprises automatically uploading any images captured contemporaneously with detection of the incident to a shipment incident reporting service for storage within an incident tracking database, wherein a shipment tracking service responds to receipt of the contemporaneously-captured photographs by tagging the photographs with a location and a time of capture and associating the stored photograph with an entry created for the incident within the incident tracking database, the entry comprising operator and carrier identifying information and any additional details about the cargo being transported that is relevant to creating a substantially complete history of the incident.

9. The method of claim 1, wherein presenting the incident response module comprises:

presenting a selectable audio recording button to activate audio recording of events occurring contemporaneously with the incident;

in response to operator selection of the audio recording button:

activating a recording function of the MCD, the activating including presenting a visual indication of an active recording process;

setting a timer for the recording to terminate;

monitoring the timer by comparing the elapsed timer with a pre-established maximum recording time threshold;

in response to one of (a) the timer expiring or reaching the pre-established maximum recording time threshold or (b) receipt of a manual input to stop the recording:

terminating the audio recording; tagging the audio recording with an incident identifier to generate an incident-related audio file; storing the incident-related audio file to local storage; and forwarding the incident-related audio file along with a notification of the incident to the incident reporting service for storage with an entry for the incident within a shipment tracking database;

wherein an audio recording of any verbal communication and interaction with law enforcement and other third parties connected to the incident is acquired in real time and made available for access by an authorized personnel.

10. The method of claim 1, wherein the input is a first voice input that is audibly detected while the MCD is in an always-on listening mode, and the method comprises:

receiving the first voice input;

comparing content within the first voice input to a set of pre-established incident trigger words or phrases that identifies at least one specific type of incident; and in response to detecting a match of the content of the first voice input with one or more of the pre-established incident trigger words or phrases, triggering activation of IRDRR application processing to record and report the specific type of incident identified within the content of the first voice input and activate incident response protocols for the operator.

11. The method of claim 1, further comprising:

determining a type of incident from among a pre-established listing of incident types that can occur with a shipment;

identifying, based on the type of incident that has occurred, specific parties relevant to the incident and to the shipment, wherein the specific parties are different based on the type of incident and the shipment entity;

identifying when the incident is a liability-attaching incident that can result in liability of the operator or shipper, potential financial or other damages, or other losses that would be covered by an insurance carrier; and in response to the incident being a liability-attaching incident:

triggering an instantiation of an IRDRR application;

identifying each relevant party that may be affected by the liability-attaching incident, the relevant parties identified comprising an insurance adjuster and at least one insurance company insuring one or more of the shipment, carrier, and the operator;

retrieving contact information for the identified relevant party; and generating and transmitting the notification of the incident directly to the relevant parties, including the insurance adjuster and the at least one insurance company, with an incident report compiled from data collected contemporaneously with the occurrence of the incident.

12. The method of claim 1, further comprising:

initiating a connection of the MCD with an incident management server of an incident reporting service within the shipment tracking system;

generating a notification about the incident to transmit to the incident management server; and transmitting the notification to the incident management server, the notification identifying at least an occurrence of the incident.

13. The method of claim 1, wherein receiving an input identifying the occurrence of the incident comprises:

receiving, from a motion sensor, an input identifying one of an impact detection or a sudden abrupt change in velocity of a shipping entity that is indicative of a collision with another object; and in response to receiving the input, activating an IRDRR application to facilitate incident data collection related to received input.

14. A computer program product comprising:

a computer readable medium; and program code stored on the computer readable medium that installed on and executed by a processor of a computer device having a display configures the computer device to perform the functions of claim 1.

15. The method of claim 1, wherein the incident is a vehicular accident involving the vessel and the UI is a traffic accident protocol window.

16. A mobile communication device (MCD) comprising:

a wireless transceiver that enables connection of the MCD with a shipment tracking service via an external network;

a display device for presenting data and objects within a user interface;

a memory having stored thereon an incident response, data recording, and reporting (IRDRR) module and a communication module;

a storage that stores data and other information; and a processor that is communicatively coupled to each of the wireless transceiver, the display device, the memory, and the storage and that executes program code of the IRDRR module, which configures the MCD to:

receive an input identifying an occurrence of an incident associated with a shipment entity, the shipment entity being one or more of a vessel, an operator, and a cargo being transported via the vessel;

in response to the input, present on the UI one or more selectable incident reporting options to activate IRDRR protocols;

generate and present on the UI an incident response module that instructs the operator of specific sequence of steps to take to complete an incident information gathering and response process;

present a list of Do's and Don'ts for the operator to read and follow, the Do's and Don'ts corresponding to an identified type of incident;

present specific prompts advising the operator what not to say and directives comprising speech suggestions that limits an exposure of the operator;

transmit to an incident management server (IMS) of a shipment tracking system a notification of the incident involving the shipment entity;

in response to the notification, receive a phone call from the IMS to complete a health check on the operator, the health check comprising a query to provide a real-time, live update on whether the incident involves an emergency situation, wherein the IMS escalate situation by communicating with a local first responder or emergency dispatch, in response to not receiving an answer to the phone call;

in response to the operator answering the phone call, present a query to verify the operator by requesting the operator provide a specific passphrase and/or security code within a prescribe period of answering the call; and in response to the operator not being able to provide the specific passphrase and/or security code, trigger the IMS to escalate situation by communicating with a local first responder or emergency dispatch.

17. The MCD of claim 16, wherein the program code that configures the MCD to present the selectable reporting options comprises program code that configures the MCD to:

present, on the display device, a graphical user interface (GUI) object for activating an IRDRR application;

in response to user selection of the GUI object, present a first incident reporting UI with the one or more selectable incident reporting options;

monitor for receipt of a first trigger that identifies a type of incident, from among a pre-established listing of incident types that can occur with the shipment entity, and activates a corresponding incident identification and response (IIR) protocol of the IRDRR application based on the identified type of incident; and perform the corresponding incident identification and response protocol in response to receipt of the first trigger.

18. The MCD of claim 16, wherein the program code that configures the MCD to present the directives comprises program code that configures the MCD to:

present, on the UI, a series of directives to the operator, the series of directives further comprising recommended actions and avoidances that limits an exposure of the operator and that directs approved operator behavior in response to the incident;

present, on the UI, a checklist of directives to be completed by the operator;

record operator input indicating completion of items on the checklist;

store an operator submitted copy of the checklist with the operator input to local storage along with corresponding incident identifying data;

attach the operator submitted copy of the checklist with a notification generated for an incident management service; and forward the notification, including the copy of the checklist, to the incident reporting service.

19. The MCD of claim 16, the program code further configuring the MCD to compile incident data to include within/with the notification, the program code comprising code that configures the MCD to:

select, based on a received trigger word or phrase within a first voice input that initiates an IRDRR application process, a corresponding notification from among multiple different notifications, each associated with a specific one of multiple different types of incident pre-established trigger words or phrases;

embed within the notification relevant incident identifying and reporting information comprising (i) at least one of an MCD identifier and an operator identifier, (ii) a geographic location and time of the incident; and (iii) any additional information inputted by the operator for inclusion within the notification; and attach to the notification any incident-related audio files or images captured contemporaneously with the incident.

20. The MCD of claim 16, wherein the program code that configures the MCD to receive an input identifying the occurrence of the incident comprises program code that configures the MDC to:

receive, from a motion sensor, an input identifying one of an impact detection or a sudden abrupt change in velocity of a shipping entity that is indicative of a collision with another object; and activate an IRDRR application to facilitate incident data collection related to the received input.

21. The MCD of claim 16, wherein the program code that configures the MCD to present the incident response module comprises program code that configures the MCD to present specific prompts advising the operator what to say and what information to share with a third party, including law enforcement personnel.

22. A shipment tracking system comprising:

a network interface enabling communication with a plurality of operator mobile communication devices (MCDs) via a network;

at least one incident management server (IMS) that is communicatively coupled to the network and which is communicatively coupled to at least one operator MCD, the at least one incident management server comprising: a memory having stored thereon an incident recording and notification (IRN) module; and a processor that executes program code of the IRN module to configure the at least one IMS to:

receive from an operator MCD a notification of an incident involving at least one shipment entity;

respond to receipt of the notification by performing a health check on the operator, wherein the IMS initiates a phone call to the operator MCD to query the operator to provide a real-time, live update on whether the incident involves an emergency situation;

first verify the operator by requesting the operator provide a specific passphrase and/or security code within a prescribe period of answering the call;

in response to not receiving an answer to the phone call from the operator or in response to the operator not being able to provide the specific passphrase and/or security code, escalate situation by communicating with a local first responder or emergency dispatch;

identify, based on a type of incident that has occurred, specific parties relevant to the incident and to a shipment, wherein the specific parties are different based on the type of incident and the shipment entity;

parse the notification to identify whether the incident is a liability-attaching incident that can result in liability of the operator or shipper, potential financial or other damages, or other losses that would be covered by an insurance carrier; and in response to the incident being a liability-attaching incident:

retrieve a list of relevant parties that require information or notification about the liability-attaching incident, the relevant parties comprising an insurance adjuster and at least one insurance company insuring one or more of the shipment, carrier, and the operator; and forward to the relevant parties, including to the insurance adjuster and the at least one insurance company, specific information about the incident that is required by the relevant party when the type of incident is recorded.

23. The shipment tracking system of claim 22, further comprising:
- an incident tracking database;
- wherein the program code that enables the processor to parse the notification further comprises code that configures the IMS to:
  - create an incident report including relevant information about the incident received with the notification and subsequent, contemporaneous data received about the incident;
  - store the incident report within an entry of the incident tracking database; and
- update the incident report in response to a later-in-time receipt of additional information related to the incident; and
- digitally compile an incident report, the incident report comprising incident information from the entry; and
- forward the compiled incident report to the relevant parties.

* * * * *